United States Patent
Suzuki

(10) Patent No.: US 10,907,555 B2
(45) Date of Patent: Feb. 2, 2021

(54) INTERNAL COMBUSTION ENGINE CONTROL SYSTEM

(71) Applicant: DENSO CORPORATION, Kariya (JP)

(72) Inventor: Yusaku Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/751,800

(22) Filed: Jan. 24, 2020

(65) Prior Publication Data

US 2020/0158034 A1 May 21, 2020

Related U.S. Application Data

(63) Continuation of application No. PCT/JP2018/024216, filed on Jun. 26, 2018.

(30) Foreign Application Priority Data

Jul. 28, 2017 (JP) .................................. 2017-146907

(51) Int. Cl.
*F02D 37/02* (2006.01)
*F02D 41/00* (2006.01)
*F02D 11/10* (2006.01)

(52) U.S. Cl.
CPC ......... *F02D 37/02* (2013.01); *F02D 41/0002* (2013.01); *F02D 11/105* (2013.01);
(Continued)

(58) Field of Classification Search
CPC .... F02D 37/02; F02D 41/0002; F02D 11/105; F02D 2041/001; F02D 2200/1004;
(Continued)

(56) References Cited

U.S. PATENT DOCUMENTS 7,970,524 B2 6/2011 Gruenter
2004/0182360 A1* 9/2004 Mashiki ................ F02D 35/027
123/305

(Continued)

FOREIGN PATENT DOCUMENTS

JP 2011-32903 2/2011
JP 2014-173535 9/2014

(Continued)

OTHER PUBLICATIONS

U.S. Appl. No. 16/751,840 to Suzuki, titled "Internal Combustion Engine Control System", filed Jan. 24, 2020 (46 pages).

(Continued)

*Primary Examiner* — Xiao En Mo
(74) *Attorney, Agent, or Firm* — Nixon & Vanderhye P.C.

(57) ABSTRACT

A control arithmetic unit uses a control storage area and computes a target control amount for combustion of an internal combustion engine according to a user required torque. A monitoring arithmetic unit uses a monitoring storage area and performs computation and monitoring of presence or absence of a torque anomaly state in which an estimated torque is deviated from an engine required torque by a predetermined amount or more. The monitoring arithmetic unit includes an engine required torque computation unit that computes the engine required torque and an estimated torque computation unit that computes the estimated torque. The engine required torque computation unit computes a reduction in an actual torque, which is caused in conjunction with a retard in ignition timing of the internal combustion engine, as a reserve torque and computes the engine required torque based on the calculated reserve torque and the user required torque.

5 Claims, 15 Drawing Sheets

(52) U.S. Cl.
CPC ............. *F02D 2041/001* (2013.01); *F02D 2200/1004* (2013.01); *F02D 2250/18* (2013.01)

(58) Field of Classification Search
CPC .... F02D 2250/18; F02D 11/107; F02D 41/22; F02D 41/024; F02D 2200/021; F02D 2200/101; F02D 2250/22
See application file for complete search history.

(56) References Cited

U.S. PATENT DOCUMENTS

| | | | |
|---|---|---|---|
| 2005/0000276 A1 | 1/2005 | Bauer et al. | |
| 2010/0037859 A1* | 2/2010 | Mashiki | F02D 41/062 123/406.33 |
| 2019/0170071 A1* | 6/2019 | Hashizume | F02D 41/1446 |
| 2020/0231136 A1* | 7/2020 | Johri | B60W 20/11 |

FOREIGN PATENT DOCUMENTS

| | | |
|---|---|---|
| WO | 2019/021722 | 1/2019 |
| WO | 2019/026545 | 2/2019 |

OTHER PUBLICATIONS

U.S. Appl. No. 16/775,651 to Goto, titled "Torque Monitoring Device", filed Jan. 29, 2020 (42 pages).
U.S. Appl. No. 16/751,800, filed Jan. 24, 2020, Internal Combustion Engine Control System.
U.S. Appl. No. 16/751,840, filed Jan. 24, 2020, Internal Combustion Engine Control System.
U.S. Appl. No. 16/775,651, filed Jan. 29, 2020, Torque Monitoring Device.

* cited by examiner

US 10,907,555 B2

INTERNAL COMBUSTION ENGINE CONTROL SYSTEM

CROSS REFERENCE TO RELATED APPLICATION

The present application is a continuation application of International Patent Application No. PCT/JP2018/024216 filed on Jun. 26, 2018, which designated the U.S. and claims the benefit of priority from Japanese Patent Application No. 2017-146907 filed on Jul. 28, 2017. The entire disclosures of all of the above applications are incorporated herein by reference.

TECHNICAL FIELD

The present disclosure relates to an internal combustion engine control system for an internal combustion engine.

BACKGROUND

Conventionally, an internal combustion engine is equipped with an apparatus to monitor a state of the internal combustion engine and to control an output torque of the internal combustion engine.

SUMMARY

According to an aspect of the present disclosure, a first arithmetic unit is configured to compute a target control amount for an internal combustion engine according to a user required torque. A second arithmetic unit monitors presence or absence of a torque anomaly state in which an estimated torque is deviated from an engine required torque by a predetermined amount or more.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
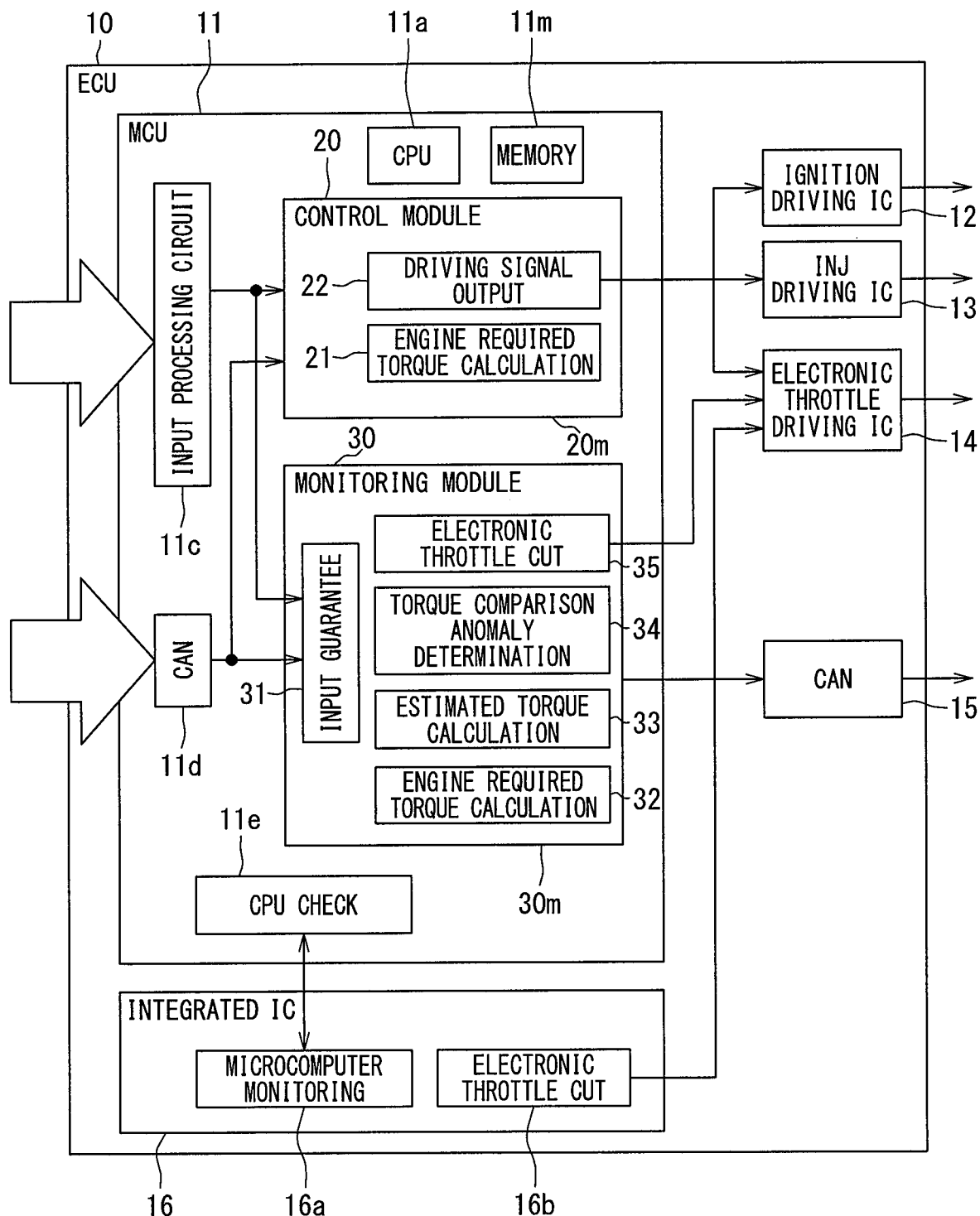
FIG. 1 is a block diagram of an internal combustion engine control system according to a first embodiment.

To begin with, an example of the present disclosure will be described.

According to an example, an apparatus monitors presence or absence of various torque anomaly, such as a large deviation between a user required torque, which is a driving torque of an internal combustion engine required by a user, and an actual torque of the internal combustion engine.

It is assumable that, even among internal combustion engines identical in revolution speed of an output shaft or in intake air quantity, an obtained driving torque may differ when an ignition timing is different. For this reason, a circuit may be provided to detect an ignition signal outputted to an ignition device thereby to enable to grasp an actual ignition timing. The present configuration may further enable to reduce an error in estimation of an actual torque used for monitoring and may further enable to monitor various torque anomaly with accuracy.

The circuit may be, for example, an arithmetic unit such as a microcomputer to compute a target value of an ignition timing, an intake air quantity, or the like of an internal combustion engine. It is noted that, in the arithmetic unit, the above-mentioned torque anomaly could take place when data in a storage area used by the arithmetic unit is corrupted. For this reason, It is further assumable that a control arithmetic unit and a monitoring arithmetic unit may be provided. In this configuration, the control arithmetic unit and the monitoring arithmetic unit may use different storage areas in computation. With respect to a storage area used by the monitoring arithmetic unit, data corruption check can be enhanced to strengthen data robustness, and yet with respect to a storage area used by the control arithmetic unit, data corruption check can be simplified to enhance computation responsiveness.

However, in an attempt to detect an ignition signal and to cause a monitoring arithmetic unit to estimate an actual torque by using an actual ignition timing obtained by the detection, a check on data corruption in the ignition signal may be needed, and consequently, a processing load on the monitoring arithmetic unit may become enormous.

According to a first aspect of the present disclosure, an internal combustion engine control system comprises a control arithmetic unit configured to perform computation by using a control storage area and to compute a target control amount, which is a target value of a control amount of a state of combustion of an internal combustion engine, according to a user required torque that is a driving torque of the internal combustion engine required by a user. The internal combustion engine control system further comprises a monitoring arithmetic unit configured, by using a monitoring storage area different from the control storage area, to perform computation and to monitor presence or absence of a torque anomaly state in which an estimated torque is deviated from an engine required torque by a predetermined amount or more. The estimated torque is an estimated value of actual torque of the internal combustion engine. The engine required torque is required of the internal combustion engine. The monitoring arithmetic unit includes an engine required torque computation unit configured to compute the engine required torque and an estimated torque computation unit configured to compute the estimated torque. The engine required torque computation unit is configured to compute a reduction in an actual torque, which is caused by a retard in ignition timing of the internal combustion engine, as a reserve torque and to compute the engine required torque based on the reserve torque as calculated and the user required torque.

The present inventors have obtained findings that an engine required torque in consideration of efficiency corresponding to an ignition timing can be computed without detecting an ignition signal by calculating a reserve torque and computing the engine required torque based on the calculated reserve torque and a user required torque. In consideration of the findings, in an internal combustion engine control system according to a first aspect, a reserve torque is calculated and an engine required torque used for monitoring is computed based on the calculated reserve torque and a user required torque. For this reason, ignition signal detection can be eliminated, and calculation of an engine required torque using an actual ignition timing obtained by the detection can be also eliminated. Consequently, a processing load on a monitoring arithmetic unit can be suppressed and further various torque anomaly can be monitored with accuracy.

According to a second aspect of the present disclosure, The monitoring arithmetic unit includes an engine required torque computation unit configured to compute the engine required torque and an estimated torque computation unit configured to compute the estimated torque. The estimated torque computation unit is configured to compute an actual ignition timing based on an operating state of the internal combustion engine and to compute the estimated torque based on the actual ignition timing computed.

The present inventors have obtained findings that "based on a revolution speed and an intake air quantity, an actual ignition timing can be estimated to some extent and in turn the above-mentioned efficiency can be estimated in accordance with the estimated actual ignition timing." In consideration of the findings, in an internal combustion engine control system according to a second aspect, an actual ignition timing is estimated based on the operating state of an internal combustion engine and an estimated torque used for monitoring is computed based on the estimated actual ignition timing. For this reason, necessity for ignition signal detection can be eliminated and further necessity for estimation of an actual torque using an actual ignition timing obtained by the detection can be eliminated. Consequently, a processing load on a monitoring arithmetic unit can be suppressed and various torque anomaly can be monitored with accuracy.

According to a third aspect of the present disclosure, The control arithmetic unit includes: a reserve torque calculation unit configured to calculate a reserve torque by converting a degradation in combustion efficiency into a torque, the degradation in combustion efficiency being equivalent to a part of combustion energy of the internal combustion engine that is not converted into a driving torque; and an ignition timing control unit configured to set a target ignition timing as the target control amount based on a torque obtained by adding the reserve torque calculated by the reserve torque calculation unit to the user required torque. The monitoring arithmetic unit includes: a reserve torque acquisition unit configured, when the reserve torque is out of a predetermined range, to acquire the reserve torque calculated by the reserve torque calculation unit and to limit the reserve torque to an upper-limit torque or a lower-limit torque; and an engine required torque computation unit configured to compute the engine required torque based on the user required torque and the reserve torque acquired by the reserve torque acquisition unit.

In an internal combustion engine control system according to a third aspect, a control arithmetic unit is configured to compute a reserve torque used for setting a target ignition timing and a monitoring arithmetic unit utilizes the calculated reserve torque to compute an engine required torque used for monitoring. For this reason, necessity for ignition signal detection can be eliminated and further an engine required torque used for monitoring can be computed with the above-mentioned efficiency corresponding to an ignition timing taken into account and thus various torque anomaly can be monitored with accuracy.

Here, data on reserve torque utilized by the monitoring arithmetic unit can be corrupted because data robustness of a control storage area is inferior to data robustness of a monitoring storage area. With respect to this problem, the monitoring arithmetic unit limits a reserve torque to an upper-limit torque or a lower-limit torque and utilizes the reserve torque; therefore, significant degradation in monitoring accuracy due to data corruption can be avoided.

According to a fourth aspect of the present disclosure, The control arithmetic unit includes a knock learning amount calculation unit configured to calculate a knock learning amount, by which an ignition timing is corrected according to presence or absence of a knock in the internal combustion engine and an ignition timing control unit configured to set a target ignition timing as the target control amount based on the knock learning amount calculated by the knock learning amount calculation unit. The monitoring arithmetic unit includes a retard amount acquisition unit configured, when the knock learning amount is out of a predetermined range, to acquire the knock learning amount calculated by the knock learning amount calculation unit and to limit the retard amount to an upper-limit retard amount or a lower-limit retard amount and an estimated torque computation unit configured to compute the estimated torque based on an operating state of the internal combustion engine and the knock learning amount acquired by the retard amount acquisition unit.

In an internal combustion engine control system according to a fourth aspect, a control arithmetic unit is configured to compute a knock learning amount used for setting a target ignition timing and a monitoring arithmetic unit utilizes the calculated knock learning amount to compute an estimated torque used for monitoring. For this reason, necessity for ignition signal detection can be eliminated and further an estimated torque used for monitoring can be computed with the above-mentioned efficiency corresponding to an ignition timing taken into account and thus any torque anomaly can be monitored with accuracy.

Here, data on reserve torque utilized by the monitoring arithmetic unit can be corrupted because data robustness of a control storage area is inferior to data robustness of a monitoring storage area. With respect to this problem, the monitoring arithmetic unit limits a knock learning amount to an upper-limit retard amount or a lower-limit retard amount and utilizes the knock learning amount; therefore, significant degradation in monitoring accuracy due to data corruption can be avoided.

A description will be given to a plurality of embodiments with reference to the drawings. In the description of the embodiments, functionally and/or structurally corresponding parts and/or associated parts may be affixed with an identical reference numeral or a reference numeral different in digit of hundred or higher. A description of other embodiments can be referred to for corresponding parts and/or associated parts.

First Embodiment

FIG. 1 illustrates an ECU 10 that is an electronic control unit mounted in a vehicle and controls operation of an internal combustion engine mounted in the vehicle. The internal combustion engine in relation to the present embodiment is an ignition firing gasoline engine but may be a self ignition diesel engine. The ECU 10 includes: an MCU (Micro Controller Unit) 11, an ignition driving IC 12, a fuel injection valve driving IC 13, an electronic throttle driving IC 14, a communication circuit 15, and an integrated IC 16.

The MCU 11 includes a CPU 11a as a processing unit, a memory 11m as a storage medium, an input processing circuit 11c, a communication circuit 11d, and a CPU check circuit 11e. In the example shown in FIG. 1, the MCU 11 is constructed by integrating the CPU 11a, the memory 11m, the input processing circuit 11c, the communication circuit 11d, and the CPU check circuit 11e over a single semiconductor chip but may be dispersedly integrated over a plurality of semiconductor chips. In case of dispersed integration over a plurality of semiconductor chips, the semiconductor chips may be mounted over a common substrate or a semiconductor chip may be mounted over each of a plurality of substrates. Each semiconductor chip may be accommodated in a single common enclosure or may be accommodated in separate enclosures.

The memory 11m is a storage medium storing a program and data and includes a non-transitional, physical storage medium that non-temporarily stores a CPU 11a-readable program. The storage medium can be provided in a semiconductor memory, a magnetic disk, or the like. When executed by the CPU 11a, a program stored in the memory 11m causes the ECU 10 to function as a device described in the present specification and causes a control device to function to perform a method described in the present specification.

A means and/or a function provided by a control device can be provided by software recorded on a physical storage medium and a computer executing the software, only software, only hardware, or a combination of these elements. For example, when a control device is provided in an electronic circuit as hardware, the control device can be provided in a digital circuit or an analog circuit including a large number of logic circuits.

The MCU 11 is inputted with various signals, including engine speed, accelerator position, intake manifold pressure, exhaust pressure, water temperature, and oil temperature and an external signal outputted from an external ECU. These signals are inputted from outside the ECU 10 to the input processing circuit 11c or the communication circuit 11d.

A signal of engine speed is a signal indicating a detection value of a crank angle sensor and based on this detection value, the MCU 11 computes a number of revolutions per unit time of a crank shaft (output shaft) of an internal combustion engine, that is, a revolution speed of an output shaft. A signal of accelerator position is a signal indicating a detection value of an accelerator pedal sensor and based on this detection value, the MCU 11 computes a pedal depression amount of an accelerator pedal operated by a driver of a vehicle, that is, a user of the internal combustion engine.

A signal of intake manifold pressure is a signal indicating a detection value of an intake pressure sensor and based on this detection value, the MCU 11 computes a pressure of intake air sucked into a combustion chamber. A signal of exhaust pressure is a signal indicating a detection value of an exhaust pressure sensor and based on this detection value, the MCU 11 computes a pressure of exhaust air discharged from the combustion chamber. A signal of water temperature is a signal indicating a detection value of a water temperature sensor and based on this detection value, the MCU 11 computes a temperature of water cooling the internal combustion engine. A signal of oil temperature is a signal indicating a detection value of an oil temperature sensor and based on this detection value, the MCU 11 computes a temperature of lubricating oil of the internal combustion engine or a temperature of working fluid of a hydraulic actuator.

One of concrete examples of external signals outputted from an external ECU is a signal representing an operating state of accessories that uses an output shaft of an internal combustion engine as a driving source. One of concrete examples of the accessories is a refrigerant compressor provided in an air conditioner conditioning the air in a vehicle compartment, which is a compressor using an output shaft of an internal combustion engine as a driving source.

The ignition driving IC 12 includes a switching element that controls supply and interruption of power to an ignition device provided in an internal combustion engine and the MCU 11 outputs a command signal to this switching element. Specifically, based on the above-mentioned various signals of engine speed and the like, the MCU 11 computes a target ignition timing that is a target value of a timing with which spark ignition is caused by the ignition device and outputs a command signal to the ignition driving IC 12 according to the computed target ignition timing.

The fuel injection valve driving IC 13 includes a switching element that controls supply and interruption of power to a fuel injection valve provided in an internal combustion engine and the MCU 11 outputs a command signal to this switching element. Specifically, based on the above-mentioned various signals of engine speed and the like, the MCU 11 computes a target injection volume that is a target value of a duration during which fuel is injected by a fuel injection valve (that is, an injection volume) and outputs a command signal to the fuel injection valve driving IC 13 according to the computed target injection volume.

The electronic throttle driving IC 14 includes a switching element that controls supply and interruption of power to an electronic throttle valve (e-throt.) provided in an internal combustion engine and the MCU 11 outputs a command signal to this switching element. Specifically, based on the above-mentioned various signals of engine speed and the like, the MCU 11 computes a target opening that is a target value of a valve opening of the electronic throttle and outputs a command signal to the electronic throttle driving IC 14 according to the computed target opening.

Thus, a state of combustion in the internal combustion engine is controlled by the ECU 10 controlling operations of an ignition device, a fuel injection valve, and an electronic throttle. A target ignition timing, a target injection volume, and a target opening computed by the MCU 11 are equivalent to a target control amount that is a target value of a control amount by which a state of combustion in the internal combustion engine is controlled.

The communication circuit 15 outputs varied information grasped by the MCU 11 to an external ECU. For example, the communication circuit 15 outputs a signal of an anomaly flag indicating that some anomaly, such as a torque anomaly state, has occurred to a display ECU that controls operation of a display device viewed by a vehicle driver. When a signal of an anomaly flag is acquired, the display ECU gives a warning display or a warning sound.

The integrated IC 16 includes a memory, a CPU, which are not shown, and the like, the CPU executing various programs stored in the memory. According to a program executed by the CPU, the integrated IC 16 functions as a microcomputer monitoring portion 16a or functions as an electronic throttle cut control unit 16b.

The CPU check circuit 11e checks whether the CPU 11a and the memory 11m are normal, for example, by performing a check (for example, parity check) on whether a program and data stored in the memory 11m are normal. The microcomputer monitoring portion 16a refers to results of checks by the CPU check circuit 11e and monitors any operation failure of the MCU 11.

When the microcomputer monitoring portion 16a detects some anomaly, the integrated IC 16 implements control on electronic throttle cut, for example, by limiting operation of an electronic throttle. For example, the integrated IC 16 fixes a target opening to a predetermined opening regardless of an accelerator position and limits an output of an internal combustion engine to less than a predetermined output. Or, the integrated IC 16 zeroes a target opening to forcedly stop the internal combustion engine. The electronic throttle cut control unit 16b outputs a signal commanding electronic throttle cut to the electronic throttle driving IC 14. The electronic throttle driving IC 14 operates with a higher priority given to an electronic throttle cut command signal than to a command signal outputted from the MCU 11.

The MCU 11 includes a control module 20 and a monitoring module 30. These modules are both a function provided by the common CPU 11a and memory 11m. That is, when the CPU 11a is executing a control program stored in a control storage area 20m in the memory 11m, the CPU 11a and the memory 11m function as the control module 20.

When the CPU 11a is executing a monitoring program stored in a monitoring storage area 30m in the memory 11m, the CPU 11a and the memory 11m function as the monitoring module 30. The control storage area 20m and the monitoring storage area 30m are separately established in different storage areas in the memory 11m.

The control module 20 provides a "control arithmetic unit" to compute the above-mentioned various target control amounts according to a user required torque that is a driving torque of an internal combustion engine required by a user. The monitoring module 30 provides a "monitoring arithmetic unit" to monitor whether a torque anomaly state is present and an estimated torque as an estimated value of an actual torque of the internal combustion engine is deviated by a predetermined amount or more from an engine required torque required of the internal combustion engine. The ECU 10 provides an internal combustion engine control system including the control arithmetic unit and the monitoring arithmetic unit.

The control module 20 has functions of an engine required torque calculation unit 21 and a driving signal output portion 22. The engine required torque calculation unit 21 calculates an engine required torque as a torque to be required of the internal combustion engine based on various signals acquired from the input processing circuit 11c and the communication circuit 11d. The driving signal output portion 22 computes the above-mentioned target control amounts of target ignition timing, target injection volume, target opening, and the like according to an engine required torque calculated at the engine required torque calculation unit 21. Further, the driving signal output portion 22 outputs various command signals to actuators, such as the ignition driving IC 12, the fuel injection valve driving IC 13, the electronic throttle driving IC 14, and the like according to the computed target control amounts.

A more detailed description will be given with reference to FIG. 2. The engine required torque calculation unit 21 has functions of a user required torque calculation unit 21a, a pumping loss calculation unit 21b, a friction loss calculation unit 21c, a torque efficiency calculation unit 21d, and computation units B1 to B6.

The user required torque calculation unit 21a calculates a user required torque based on the above-mentioned engine speed and accelerator position. With a higher engine speed and with a larger accelerator position, a user required torque is calculated as a higher value. For example, a map indicating a correlation between engine speed and accelerator position and user required torque is stored in the memory 11m in advance and the user required torque calculation unit 21a refers to the map to calculate a user required torque corresponding to an engine speed and an accelerator position.

The pumping loss calculation unit 21b calculates a pumping loss torque that is a value obtained by converting a pumping loss into a torque based on the above-mentioned intake manifold pressure and exhaust pressure. Pumping loss means an energy loss caused by resistance received from air intake and exhaust when a piston of an internal combustion engine reciprocates. With a lower intake manifold pressure, an intake resistance in the intake stroke of a piston is considered to be large and a pumping loss is set to a higher value. With a higher exhaust pressure, an exhaust resistance in the exhaust stroke of a piston is considered to be large and a pumping loss is set to a higher value. For example, a map indicating a correlation between intake manifold pressure and exhaust pressure and pumping loss is stored in the memory 11m in advance and the pumping loss calculation unit 21b refers to the map to calculate a pumping loss corresponding to an intake manifold pressure and an exhaust pressure.

The friction loss calculation unit 21c calculates a friction loss torque that is a value obtained by converting a friction loss into a torque based on the above-mentioned water temperature and oil temperature. Friction loss means a mechanical energy loss caused by friction between a piston of an internal combustion engine and a cylinder when the piston reciprocates. As a water temperature gets out of a proper range and becomes lower or higher, friction is considered to be large and a friction loss is set to a higher value. With a lower oil temperature, the viscosity of a lubricating oil or the like is considered to be high and a friction loss is set to a higher value. For example, a map indicating a correlation between water temperature and oil temperature and friction loss is stored in the memory 11m in advance and the friction loss calculation unit 21c refers to the map to calculate a friction loss corresponding to a water temperature and an oil temperature.

The computation unit B1 adds a pumping loss calculated by the pumping loss calculation unit 21b, a friction loss calculated by the friction loss calculation unit 21c, and a loss torque learning value to compute a total loss torque. The computation unit B2 adds a user required torque calculated by the user required torque calculation unit 21, a total loss torque computed by the computation unit B1, and an external required torque to compute a loss inclusive torque. One of examples of external required torque is a torque equivalent to an increase in power generation by increasing a power generation amount by a generator driven by an internal combustion engine in order to charge an onboard battery.

The computation unit B3 adds a torque equivalent to each of idle reserve, catalyst warming-up reserve, and accessory reserve to compute a reserve torque. Each of these reserve torques is set by the control module 20 according to an operating state of an internal combustion engine including engine speed, engine load, water temperature, and the like. The computation unit B4 adds a reserve torque computed by the computation unit B3 to a loss inclusive torque computed by the computation unit B2 to compute a reserve inclusive torque.

Idle reserve torque means a torque equivalent to an increase in torque when during idling of an internal combustion engine, control is implemented to increase a torque to stabilize combustion. Catalyst warming-up reserve torque means a value obtained by converting a loss in combustion energy used to increase an exhaust temperature when warm-up control is implemented to increase the exhaust temperature to increase a temperature of a catalyst for purifying exhaust gas from an internal combustion engine to an activation temperature or higher. Accessory reserve torque means a torque required to drive accessories, such as a generator, by using an internal combustion engine as a driving source.

The torque efficiency calculation unit 21d calculates a torque efficiency based on a best torque generation ignition timing (MBT ignition timing), a knock learning inclusive base retard amount, and a target lambda. MBT ignition timing means an ignition timing with which a best torque is obtained and varies according to engine speed, engine load, water temperature, and the like. However, with an MBT ignition timing, knocking is prone to occur; therefore, ignition is required to occur with a timing retarded by a predetermined time from the MBT ignition timing, that is, with a timing retarded by a predetermined angle from the MBT ignition timing. This retarded timing is referred to as a base ignition timing. This retard amount (base retard amount) varies according to engine speed, engine load, water temperature, and the like.

When knocking is detected by a sensor, feedback control is implemented to retard an ignition timing by a predetermined time to make a correction and learning control to reflect this retard correction amount (knock learning amount) in the subsequent ignition timing controls is referred to as knock learning. A timing obtained by reflecting a knock learning amount in a base ignition timing is equivalent to a target ignition timing.

The computation unit B5 computes a timing obtained by subtracting a target ignition timing from an MBT ignition timing as an MBT retard amount that is a retard amount of a target ignition timing relative to an MBT ignition timing.

The torque efficiency calculation unit 21d calculates a torque efficiency based on an MBT retard amount computed by the computation unit B5 and a target lambda.

Torque efficiency means a ratio of energy converted into a rotating torque of a crank shaft to combustion energy in a combustion chamber. With a smaller MBT retard amount, that is, with a target ignition timing closer to an MBT ignition timing, a torque efficiency is calculated as a higher value. Target lambda means a target value of a ratio (lambda) of air and fuel contained in an air-fuel mixture burnt in a combustion chamber and the torque efficiency calculation unit 21d calculates a torque efficiency as a value corresponding to a target lambda. For example, a map indicating a correlation between MBT retard amount and target lambda and torque efficiency is stored in the memory 11m in advance and the torque efficiency calculation unit 21d refers to the map to calculate a torque efficiency corresponding to an MBT retard amount and a target lambda.

Each of the above-mentioned MBT ignition timing, base ignition timing, and target lambda is set by the control module 20 according to an operating state of an internal combustion engine including engine speed, engine load, water temperature, and the like.

Learning control related to the above-mentioned knock learning is implemented by the control module 20. The ECU 10 in the present embodiment includes a detection circuit detecting a driving current or voltage outputted from the ignition driving IC. The control module 20 uses a detection value from the detection circuit to compute an engine required torque. Specifically, the control module 10 calculates an actual ignition timing based on the above-mentioned detection value and uses the actual ignition timing to implement learning control related to knock learning and calculate a knock learning amount.

The computation unit B6 divides a reserve inclusive torque computed by the computation unit B4 by a torque efficiency calculated by the torque efficiency calculation unit 21d to compute an engine required torque for control used for engine control. In short, the engine required torque calculation unit 21 divides a value obtained by adding a total loss torque and a reserve torque to a user required torque by a torque efficiency to calculate an engine required torque.

As mentioned above, the monitoring module 30 monitors whether a torque anomaly state is present in which an estimated torque is deviated from an engine required torque by a predetermined amount or more and estimated torque means a value obtained by estimating an actual torque of an internal combustion engine. Engine required torque means a torque required of an internal combustion engine and is synonymous with an engine required torque calculated by the engine required torque calculation unit 21 of the control module 20. However, an engine required torque calculated at the monitoring module 30 is a value used to monitor various torque anomaly and an engine required torque calculated at the control module 20 is a value used to calculate a target control amount for an internal combustion engine. The engine required torque for monitoring and engine required torque for control are values computed in different storage areas in the memory 11m.

As illustrated in FIG. 1, the monitoring module 30 has functions of an input guarantee portion 31, an engine required torque computation unit 32, an estimated torque computation unit 33, a torque comparison anomaly determination portion 34, and an electronic throttle cut control unit 35.

The input guarantee portion 31 checks (for example, parity check) that data of various signals acquired from the input processing circuit 11c and the communication circuit 11d is normal. If any data is abnormal, the input guarantee portion 31 performs data restoration, data re-acquisition, data discard, or the like. As a result, the monitoring module 30 can be prevented from using abnormal data to perform various calculations. That is, the input guarantee portion 31 guarantees that varied data used for calculation by the monitoring module 30 is normal.

The torque comparison anomaly determination portion 34 calculates a difference between an engine required torque calculated by the engine required torque computation unit 32 and an estimated torque calculated by the estimated torque computation unit 33 and, when the difference is a predetermined value or higher, determines that the above-mentioned torque anomaly state is present. When the presence of a torque anomaly state is determined, the electronic throttle cut control unit 35 outputs a signal commanding electronic throttle cut to the electronic throttle driving IC 14 similarly to the electronic throttle cut control unit 16b.

Figure 3:
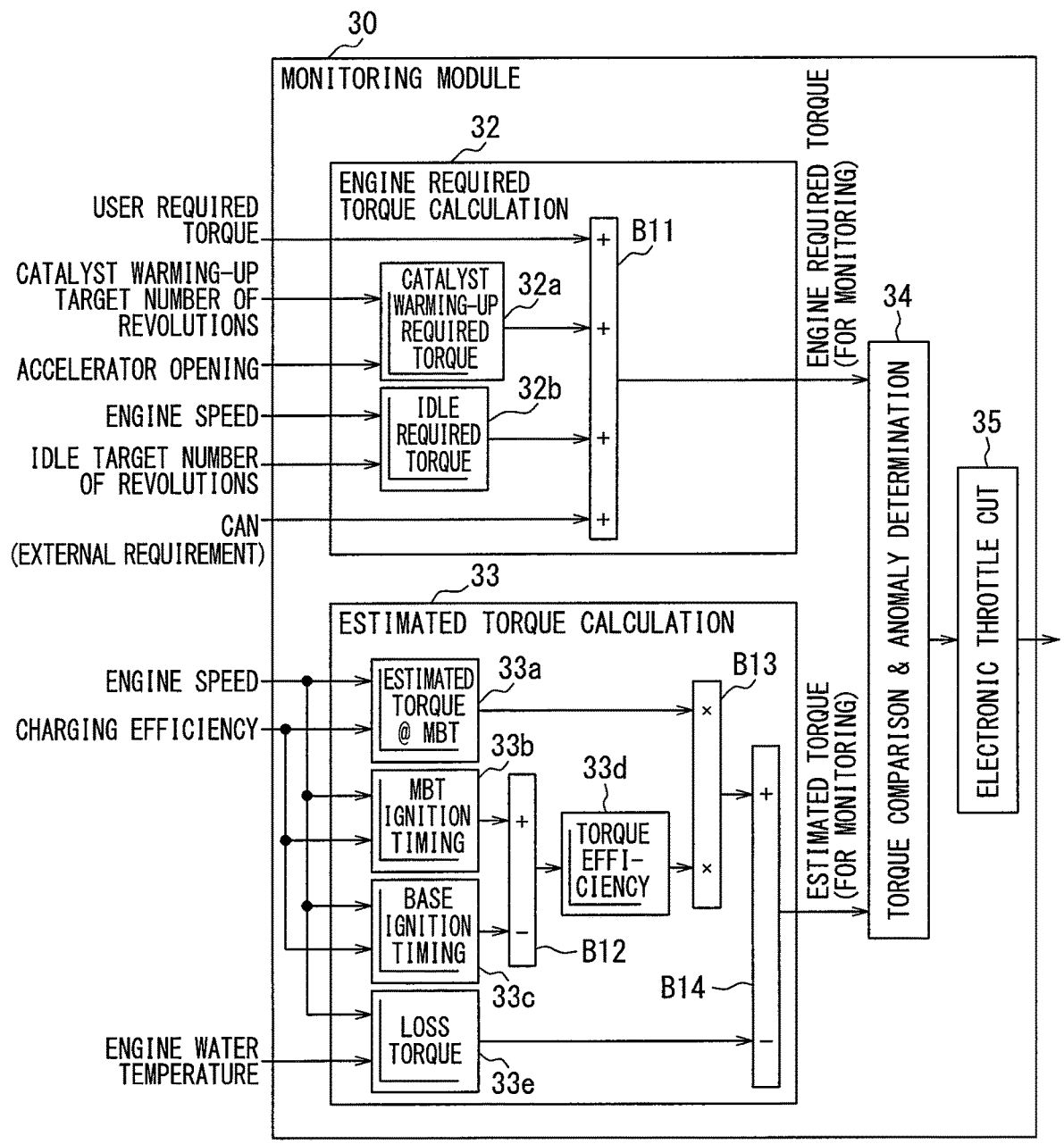
FIG. 3 is a block diagram of a monitoring module shown in FIG. 1.

As illustrated in FIG. 3, the engine required torque computation unit 32 has functions of a catalyst warming-up required torque calculation unit 32a, an idle required torque calculation unit 32b, and a computation unit B11.

The catalyst warming-up required torque calculation unit 32a calculates a catalyst warming-up required torque based on a catalyst warming-up target number of revolutions and the above-mentioned accelerator position. As mentioned above, in warming-up control, an exhaust temperature is increased to increase a temperature of a catalyst purifying an exhaust of an internal combustion engine to an activation temperature or higher and a target value of an engine speed during a period for which warming-up control is being implemented is a catalyst warming-up target number of revolutions. The catalyst warming-up required torque calculation unit 32a calculates a catalyst warming-up required torque based on an accelerator position and a catalyst warming-up target number of revolutions during a period for which warming-up control is being implemented.

Catalyst warming-up required torque is synonymous with catalyst warming-up reserve torque. However, a catalyst warming-up required torque calculated at the monitoring module 30 is a value used to monitor various torque anomaly and a catalyst warming-up reserve torque calculated at the control module 20 is a value used to calculate a target control amount for an internal combustion engine. That is, the catalyst warming-up required torque for monitoring and catalyst warming-up reserve torque for control are values computed in different storage areas in the memory 11m.

FIG. 3 shows catalyst warming-up target number of revolutions and accelerator position as examples of variables used to calculate a catalyst warming-up required torque but other variables include water temperature, user required torque, engine speed, and intake charging efficiency. Intake charging efficiency means a ratio of a flowrate of intake air compressed in a combustion chamber to a flowrate of intake air passing through a throttle valve. The catalyst warming-up required torque calculation unit 32a uses at least one of these variables to calculate a catalyst warming-up required torque.

Figure 4:
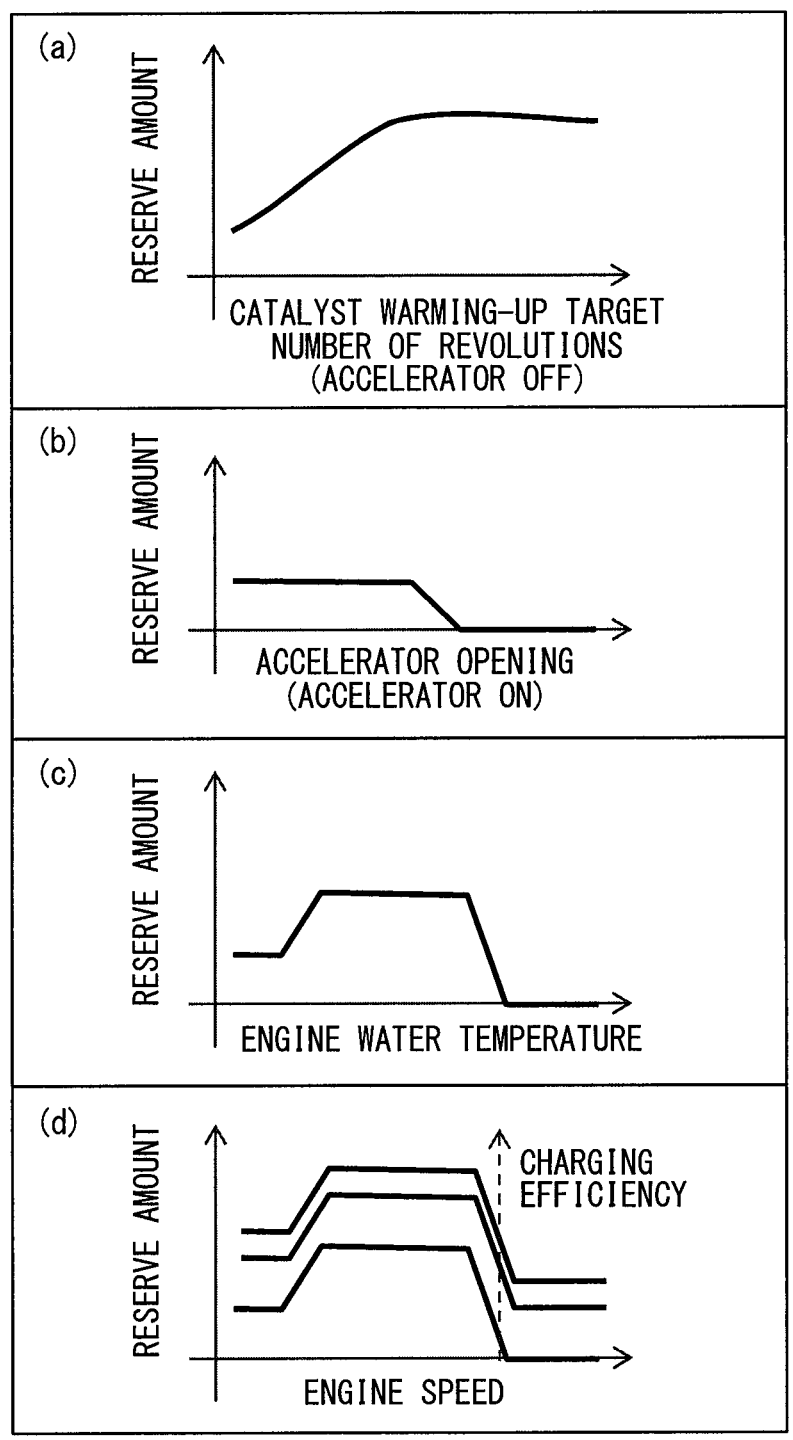
FIG. 4 is a map indicating a relation between a reserve amount related to a catalyst warming-up required torque and various variables.

As shown in (a) in FIG. 4, when an accelerator pedal is not depressed, a catalyst warming-up required torque (reserve amount) is calculated as a larger value with a larger catalyst warming-up target number of revolutions. As shown in (b), when an accelerator pedal is depressed, a catalyst warming-up required torque is set to a predetermined value with an accelerator position being a predetermined value or less and is set to zero with an accelerator position being equal to a predetermined value or larger. As shown in (c) and (d), a catalyst warming-up required torque may be increased or decreased according to a water temperature or an engine speed and as shown in (d), especially, a catalyst warming-up required torque may be increased or decreased according to a charging efficiency.

The idle required torque calculation unit 32b calculates an idle required torque based on an idle target number of revolutions and the above-mentioned engine speed. As mentioned above, in idle control, a torque is increased to stabilize combustion during idling of an internal combustion engine and a target value of an engine speed during a period for which this idle control is being implemented is an idle target number of revolutions. The idle required torque calculation unit 32b calculates an idle required torque based on an engine speed and an idle target number of revolutions during a period for which idle control is being implemented.

Idle required torque is synonymous with idle reserve torque. However, an idle required torque calculated at the monitoring module 30 is a value used to monitor various torque anomaly and an idle reserve torque calculated at the control module 20 is a value used to calculate a target control amount for an internal combustion engine. That is, the idle required torque for monitoring and idle reserve torque for control are values computed in different storage areas in the memory 11m.

FIG. 3 shows idle target number of revolutions and engine speed as examples of variables used to calculate an idle required torque but other variables include water temperature, vehicle speed, atmospheric pressure, and intake charging efficiency. The idle required torque calculation unit 32b uses at least one of these variables to calculate an idle required torque.

Figure 5:
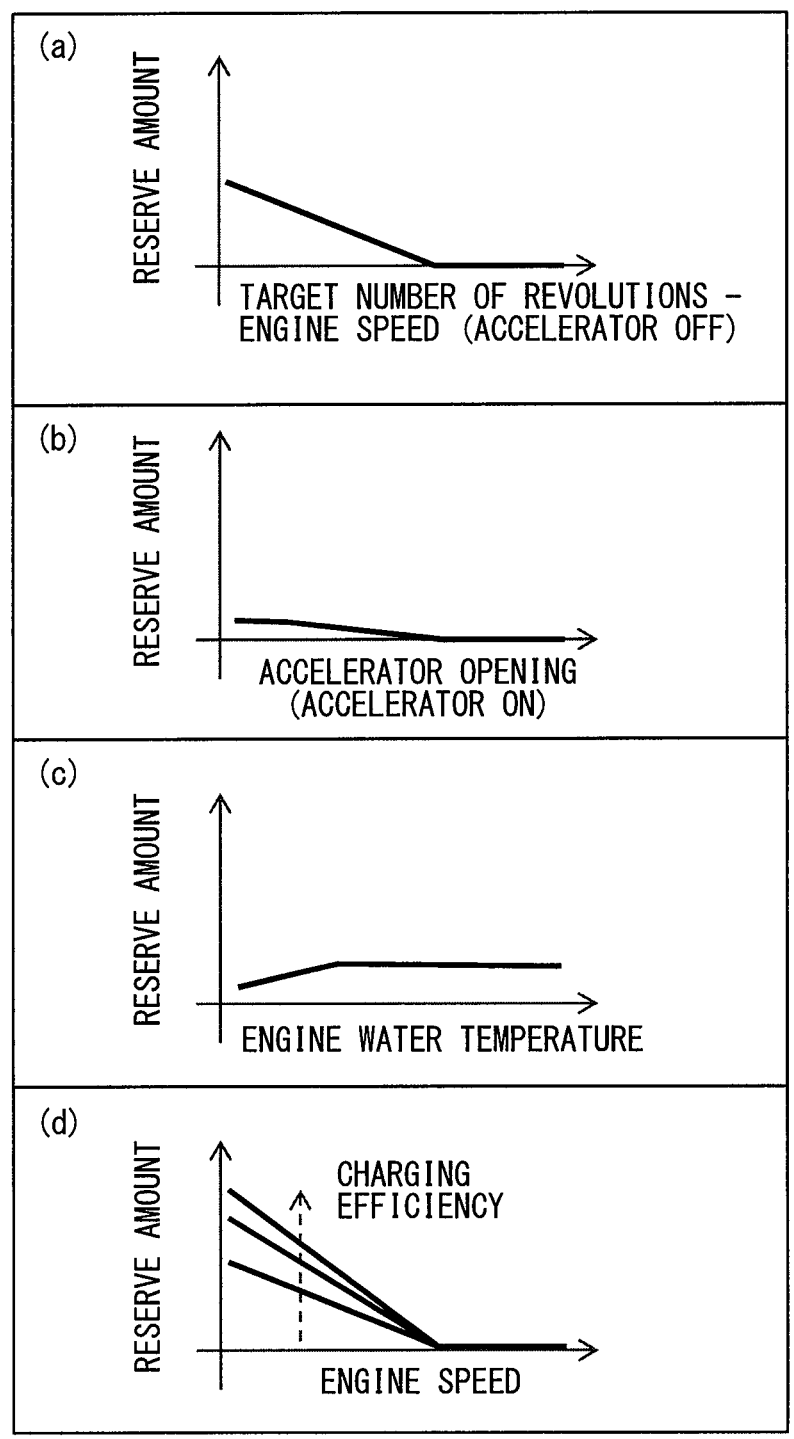
FIG. 5 is a map indicating a relation between a reserve amount related to an idle required torque and various variables.

As shown in (a) in FIG. 5, when an accelerator pedal is not depressed, an idle required torque (reserve amount) is calculated as a larger value with a smaller difference between a target number of revolutions and an engine speed. As shown in (b), when an accelerator pedal is depressed, an idle required torque is calculated as a larger value with an accelerator position being smaller. As shown in (c) and (d), an idle required torque may be increased or decreased according to a water temperature or an engine speed and as shown in (d), especially, an idle required torque may be increased or decreased according to a charging efficiency.

The computation unit B11 adds a catalyst warming-up required torque and an idle required torque calculated at the catalyst warming-up required torque calculation unit 32a and the idle required torque calculation unit 32b, a user required torque, and an external required torque to calculate an engine required torque required of an internal combustion engine. A user required torque used in this calculation is calculated using data on engine speed and accelerator position guaranteed by the input guarantee portion 31.

According to the foregoing, the engine required torque computation unit 32 calculates an engine required torque required of an internal combustion engine based on various signals (data) acquired from the input processing circuit 11c and the communication circuit 11d and guaranteed by the input guarantee portion 31.

As illustrated in FIG. 3, the estimated torque computation unit 33 has functions of an estimated torque calculation unit 33a, an MBT ignition timing calculation unit 33b, a base ignition timing calculation unit 33c, a torque efficiency calculation unit 33d, a loss torque calculation unit 33e, and computation units B12, B13, and B14.

The estimated torque calculation unit 33a estimates an actual driving torque (MBT estimated torque) of an internal combustion engine obtained when an ignition timing is MBT based on the above-mentioned charging efficiency and an engine speed. With a higher engine speed and with a higher charging efficiency, an MBT estimated torque is calculated as a larger value. For example, a map indicating a correlation between engine speed and charging efficiency and MBT estimated torque is stored in the memory 11m in advance and the estimated torque calculation unit 33a refers to the map to calculate an MBT estimated torque corresponding to an engine speed and a charging efficiency.

The MBT ignition timing calculation unit 33b calculates an MBT ignition timing based on a charging efficiency and an engine speed. The base ignition timing calculation unit 33c calculates a base ignition timing based on a charging efficiency and an engine speed. The MBT ignition timing and base ignition timing are calculated by referring to a map stored in the memory 11m in advance as by the estimated torque calculation unit 33a.

The computation unit B12 computes a value obtained by subtracting a base ignition timing calculated by the base ignition timing calculation unit 33c from an MBT ignition timing calculated by the MBT ignition timing calculation unit 33b as the above-mentioned base retard amount. The torque efficiency calculation unit 33d calculates the above-mentioned torque efficiency based on a base retard amount computed by the computation unit B12. However, the torque efficiency calculation unit 33d considers a knock learning amount to be a predetermined amount or zero to calculate a torque efficiency.

The loss torque calculation unit 33e calculates a loss torque obtained by converting a loss energy including a pumping loss and a friction loss into a torque based on an engine speed and a water temperature. For example, a map indicating a correlation between engine speed and water temperature and loss torque is stored in the memory 11m in advance and the loss torque calculation unit 33e refers to the map to calculate a loss torque corresponding to an engine speed and a water temperature.

The computation unit B13 computes a value obtained by multiplying an MBT estimated torque calculated by the estimated torque calculation unit 33a by a torque efficiency calculated by the torque efficiency calculation unit 33d as an estimated torque without consideration of a loss torque. The computation unit B14 computes a value obtained by subtracting a loss torque calculated by the loss torque calculation unit 33e from an estimated torque computed by the computation unit B13 as an estimated torque for monitoring.

According to the foregoing, the estimated torque computation unit 33 estimates a driving torque actually outputted by an internal combustion engine based on various signals (data) acquired from the input processing circuit 11c and the communication circuit 11d and guaranteed by the input guarantee portion 31.

During operation of an internal combustion engine, a monitoring function provided by the monitoring module 30 is constantly actuated. Specifically, main processing illustrated in FIG. 6 is constantly performed.

Figure 6:
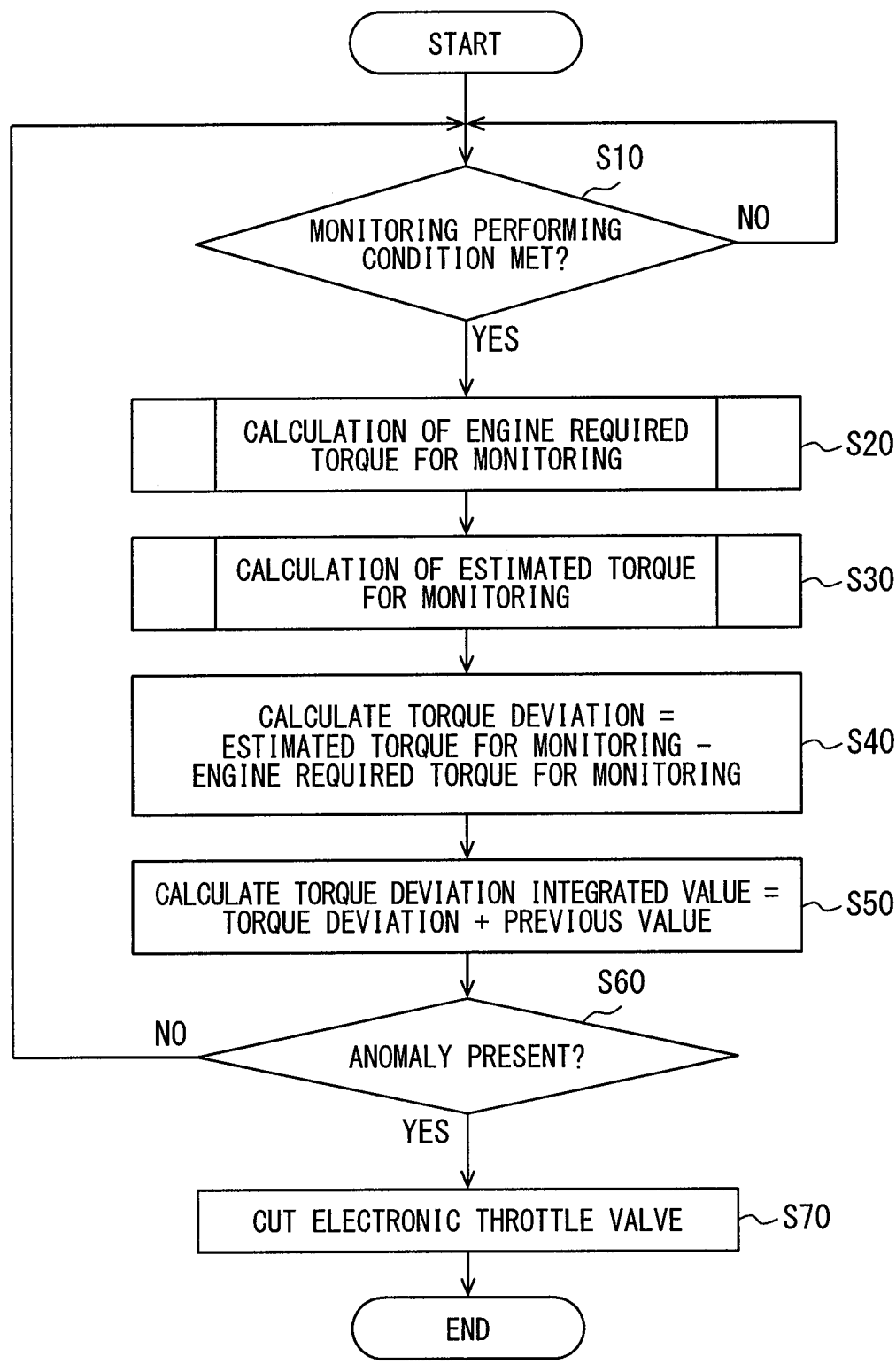
FIG. 6 is a flowchart illustrating a procedure for torque monitoring control according to the first embodiment.

In the main processing illustrated in FIG. 6, at S10, first, whether a monitoring performing condition is met is determined. Concrete examples of monitoring performing conditions include that a check by the CPU check circuit 11e should have been completed, that the microcomputer monitoring portion 16a should not have detected any anomaly, and the like.

Figure 7:
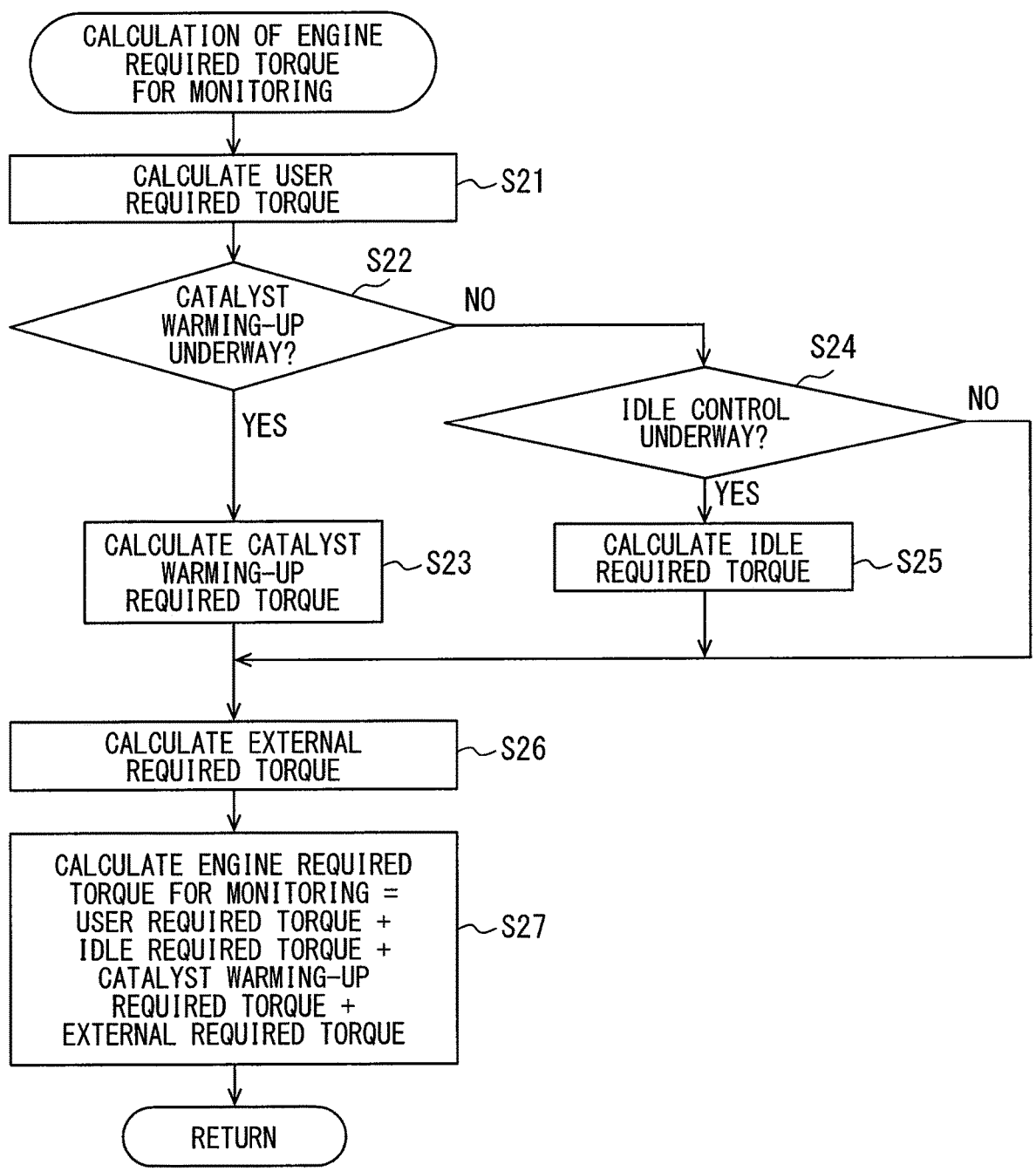
FIG. 7 is a flowchart illustrating a procedure for calculation processing for the required torque for monitoring shown in FIG. 6.

When a determination that a monitoring performing condition is met is made, at S20, the engine required torque computation unit 32 calculates an engine required torque for monitoring according to subroutine processing shown in FIG. 7. At S30, the estimated torque computation unit 33 calculates an estimated torque for monitoring according to subroutine processing shown in FIG. 8.

At S40, S50, and S60, an anomaly determination is made by the torque comparison anomaly determination portion 34. Specifically, at S40, first, an engine required torque calculated at S20 is subtracted from an estimated torque calculated at S30 to calculate a torque deviation. At S50, subsequently, the torque deviation calculated at S40 is integrated with a previous value to calculate an integrated value. At S60, subsequently, when the integrated value calculated at S50 is a predetermined value or higher, presence of a torque anomaly is determined. The integrated value is reset, for example, by stopping an internal combustion engine. When presence of a torque anomaly is determined at S60, at S70, the electronic throttle cut control unit 35 outputs an electronic throttle cut command signal.

In the subroutine processing shown in FIG. 7, at S21, first, a user required torque is calculated. Though in the engine required torque computation unit 32 shown in FIG. 3, a block of user required torque calculation is omitted, a user required torque is calculated based on an engine speed and an accelerator position, for example, as by the user required torque calculation unit 21a. However, data on engine speed and accelerator position guaranteed by the input guarantee portion 31 is used to calculate a user required torque.

At S22, whether warming-up control is being implemented to increase a temperature of a catalysis to an activation temperature or higher is determined. Whether warming-up control is being implemented is determined, for example, based on an engine speed, an accelerator position, a water temperature, and the like. When warming-up control being underway is determined, at S23, the catalyst warming-up required torque calculation unit 32a calculates a catalyst warming-up required torque based on at least one of a catalyst warming-up target number of revolutions, an accelerator position, a water temperature, a user required torque, an engine speed, and an intake charging efficiency.

When warming-up control being underway is not determined, at S24, whether idle control is being implemented to increase a torque to stabilize combustion during idling is determined. Whether idle control is being implemented is determined, for example, based on an engine speed and an accelerator position. When idle control being underway is determined, at S25, the idle required torque calculation unit 32b calculates an idle required torque based on at least one of an idle target number of revolutions, an engine speed, a water temperature, a vehicle speed, an atmospheric pressure, and an intake charging efficiency.

At S26, an external required torque that is a driving torque caused by an external requirement, such as increase in power generation amount, is calculated. At S27, subsequently, the user required torque acquired at S21, the idle required torque acquired at S25, the catalyst warming-up required torque acquired at S23, and the external required torque acquired at S26 are added. A value obtained by this addition is calculated as an engine required torque for monitoring.

When the processing of S25 is not performed, for example, when warming-up control being underway is determined at S22, an idle required torque, if any, calculated immediately before is used in the calculation at S27. When the processing of S23 is not performed, a catalyst warming-up required torque, if any, calculated immediately before is used in the calculation at S27.

Figure 8:
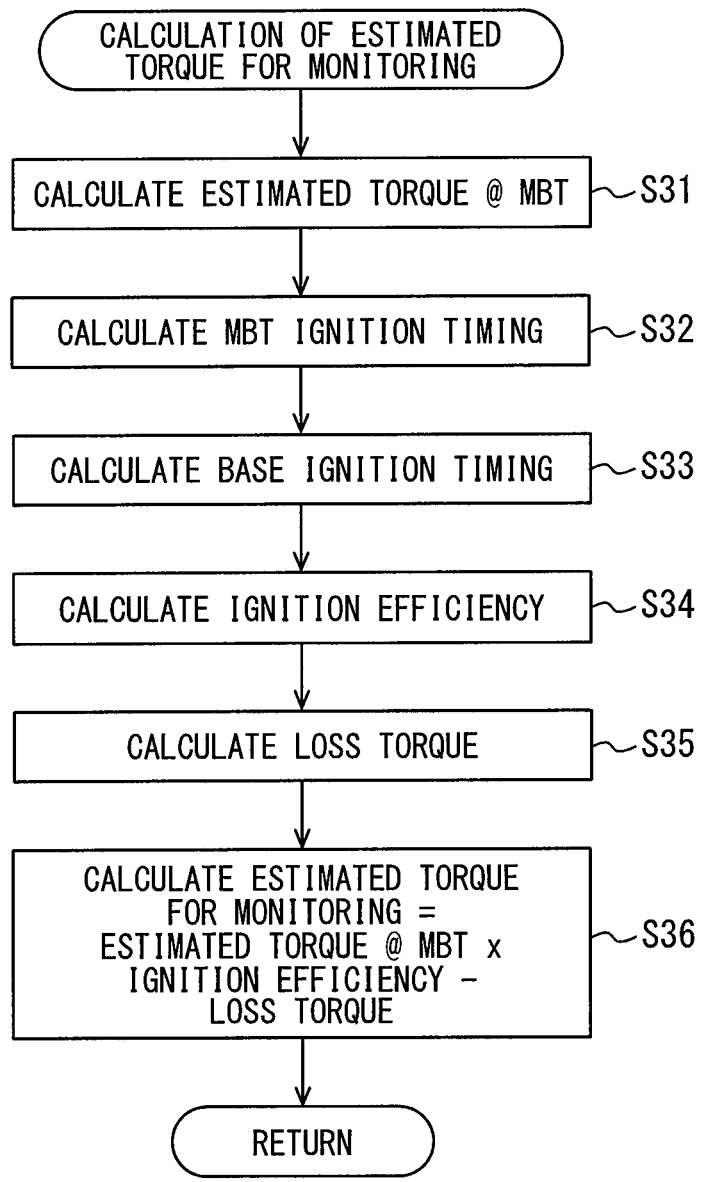
FIG. 8 is a flowchart illustrating a procedure for calculation processing for the estimated torque for monitoring shown in FIG. 6.

In the subroutine processing shown in FIG. 8, at S31, first, the estimated torque calculation unit 33a calculates an MBT estimated torque based on an engine speed and a charging efficiency. At S32, the MBT ignition timing calculation unit 33b calculates an MBT ignition timing based on a charging efficiency and an engine speed. At S33, the base ignition timing calculation unit 33c calculates a base ignition timing based on a charging efficiency and an engine speed.

At S34, the torque efficiency calculation unit 33d calculates an ignition efficiency based on a value (base retard amount) obtained by subtracting the base ignition timing calculated at S33 from the MBT ignition timing calculated at S32. At S35, the loss torque calculation unit 33e calculates a loss torque based on an engine speed and a water temperature.

At S36, the MBT estimated torque acquired at S31 is multiplied by the ignition efficiency acquired at S34 and the loss torque acquired at S35 is subtracted from the value obtained by this multiplication to calculate an estimated torque for monitoring.

Figure 9:
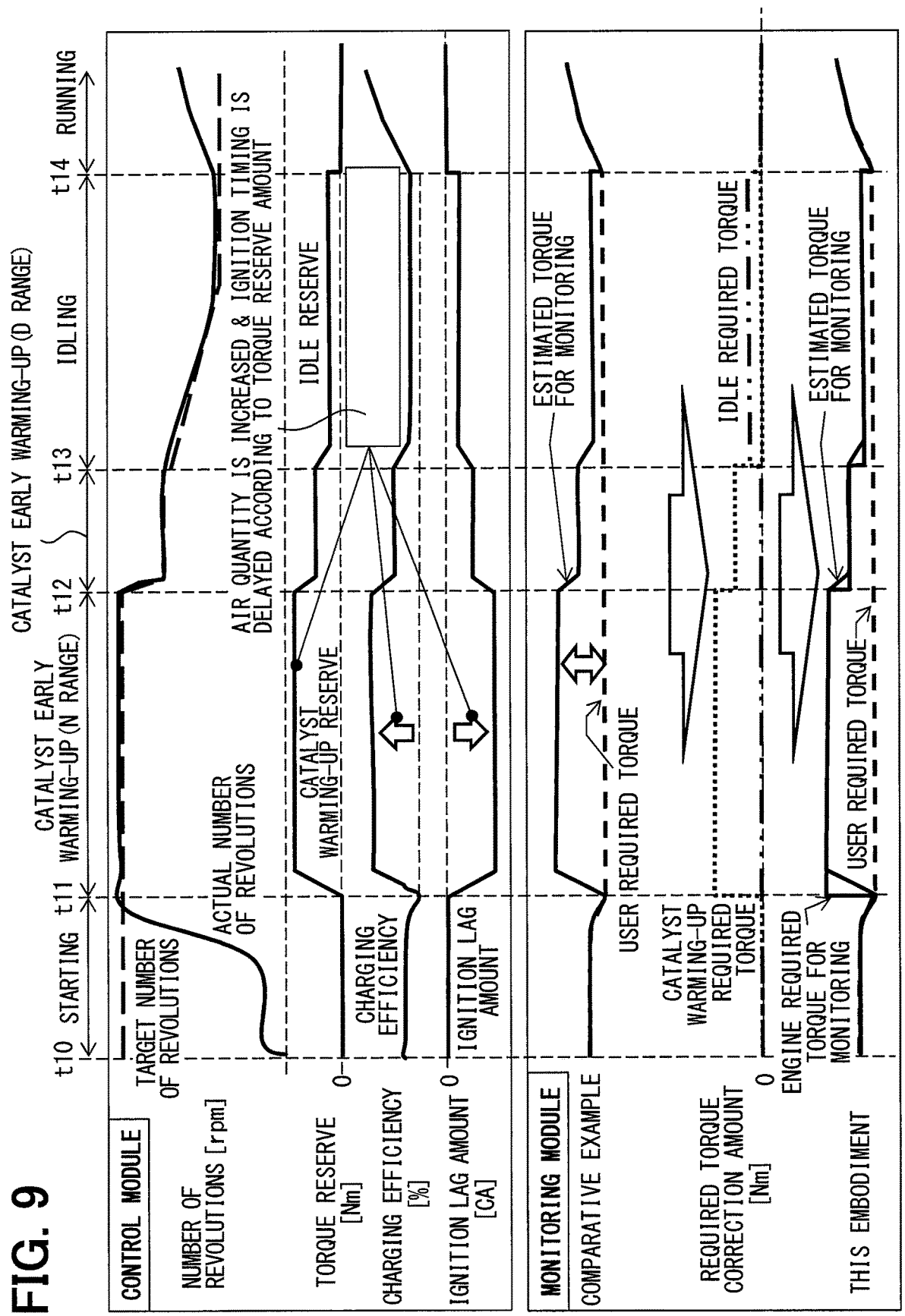
FIG. 9 is a time chart indicating a progression of results of computation by the control module and the monitoring module relative to a progression of an operating state of the internal combustion engine according to the first embodiment.

In the example shown in FIG. 9, at time of t10, a starter motor of an internal combustion engine is actuated to start operation of the internal combustion engine and idling is performed from time of t11 to time of t14 and at time of t14, subsequently, running of the relevant vehicle is started. During a period from time of t11 to time of t13 during idling, warming-up control is implemented to early increase a catalyst temperature. During a period from time of t11 to time of t12 during the warming-up control, idling is performed in an N range in which running is disabled and during a subsequent period from time of t12 to time of t13, idling is performed in a D range in which running is enabled. With respect to this progression of operating state of the internal combustion engine, the upper part of FIG. 9 indicates change in various values calculated by the control module and the lower part of FIG. 9 indicates change in various values calculated by the monitoring module.

First, a description will be given to the details of the upper part of FIG. 9 related to the control module 20. When an actual number of revolutions is increased by the starter motor and reaches a target number of revolutions during the starting period (t10 to t11), a catalyst warming-up reserve used at the computation unit B3 is increased. As a result, a loss inclusive torque computed at the computation unit B4 is increased and thus an engine required torque for control is increased. For this reason, a charging efficiency is increased, a torque being increased and an ignition retard amount is increased, an exhaust temperature being raised. At time of t12, thereafter, with decrease in catalyst warming-up reserve amount, an engine required torque is reduced, a target number of revolutions is reduced and an actual number of revolutions is lowered, and a charging efficiency is reduced and an ignition retard amount is reduced.

When at time of t13, thereafter, catalyst warming-up is completed and a catalyst warming-up reserve amount is zeroed, control is implemented to attain a charging efficiency and an ignition retard amount corresponding to an idle reserve used at the computation unit B3. When at time of t14, thereafter, an idle reserve amount is zeroed, an ignition retard amount and a charging efficiency are controlled based on a user required torque and a loss torque.

A description will be given to the details of the lower part of FIG. 9 related to the monitoring module 30. In the part of a comparative example, the solid line indicates an estimated torque calculated at the estimated torque computation unit 33 and the dotted line indicates a user required torque used by the engine required torque computation unit 32 to calculate an engine required torque. When the engine required torque computation unit 32 does not include the catalyst warming-up required torque calculation unit 32a or the idle required torque calculation unit 32b unlike the present embodiment, an erroneous monitoring result is obtained as described below:

Since a reserve torque is not reflected in calculation of an engine required torque, as indicated by the arrow in the part of the comparative example, an engine required torque calculated at the engine required torque computation unit 32 and an estimated torque calculated at the estimated torque computation unit 33 are deviated from each other. As a result, even when an estimated torque is accurately calculated as a value close to an actual torque in a situation in which a torque greater than a user required torque by an amount equivalent to an actually required reserve torque is required, presence of a torque anomaly is erroneously determined because of a large deviation.

In the present embodiment, meanwhile, as shown in the part of required torque correction amount, a catalyst warming-up required torque and an idle required torque are calculated by the catalyst warming-up required torque calculation unit 32a and the idle required torque calculation unit 32b. A thus calculated reserve torque is added to a user required torque to calculate an engine required torque. Therefore, as shown in the part of the present embodiment, a deviation between an engine required torque for monitoring and an estimated torque is suppressed and a possibility of the above-mentioned erroneous determination is reduced.

According to the present embodiment, the monitoring module 30 includes the engine required torque computation unit 32 and the estimated torque computation unit 33. The engine required torque computation unit 32 calculates a reduction in actual torque produced in conjunction with a retard in ignition timing of an internal combustion engine as a reserve torque and computes an engine required torque based on the calculated reserve torque and a user required torque. For this reason, a possibility of erroneous determination shown in the part of the comparative example in FIG. 9 can be reduced and various torque anomaly can be monitored with accuracy.

In the present embodiment, a reserve torque is calculated and an engine required torque for monitoring is computed based on the calculated reserve torque and a user required torque; therefore, an engine required torque can be computed without use of a detection value of actual ignition timing. Since this type of detection values is short in detection cycle, a processing load on the input guarantee portion 31 is increased when an attempt is made to cause the input guarantee portion 31 to guarantee data. In addition, a number of ports for data input required of the input guarantee portion 31 is increased by an amount equivalent to the above-mentioned detection values and increase in a cost of the input guarantee portion 31 is incurred. According to the present embodiment that allows an engine required torque to be computed without use of a detection value of actual ignition timing, suppression of a processing load on the monitoring module 30 and suppression of increase in cost can be achieved.

For a detection value of actual ignition timing used to control an internal combustion engine, high detection accuracy and a short sampling cycle are required but for actual ignition timing used to monitor various torque anomaly, the above-mentioned requirement is lessened as compared with cases where the detection value is used to control the internal combustion engine. In consideration of the foregoing, various torque anomaly can be monitored without use of a detection value as in the present embodiment.

In the present embodiment, further, the control module 20 makes setting such that a target ignition timing is retarded when catalyst warming-up is required and the engine required torque computation unit 32 calculates a reserve torque such that the reserve torque is not less than a torque equivalent to degradation in combustion efficiency corresponding to a retard amount for the catalyst warming-up requirement. In the present embodiment, furthermore, the control module 20 makes setting such that a target ignition timing is retarded during idling and the engine required torque computation unit 32 calculates a reserve torque such that the reserve torque is not less than a torque equivalent to degradation in combustion efficiency corresponding to a retard amount for the idle required torque. Since a degradation in combustion efficiency caused by an ignition timing retard like a catalyst warming-up requirement or an idle requirement is reflected in an engine required torque for monitoring, the above-mentioned possibility of erroneous determination can be suppressed.

Second Embodiment

Figure 10:
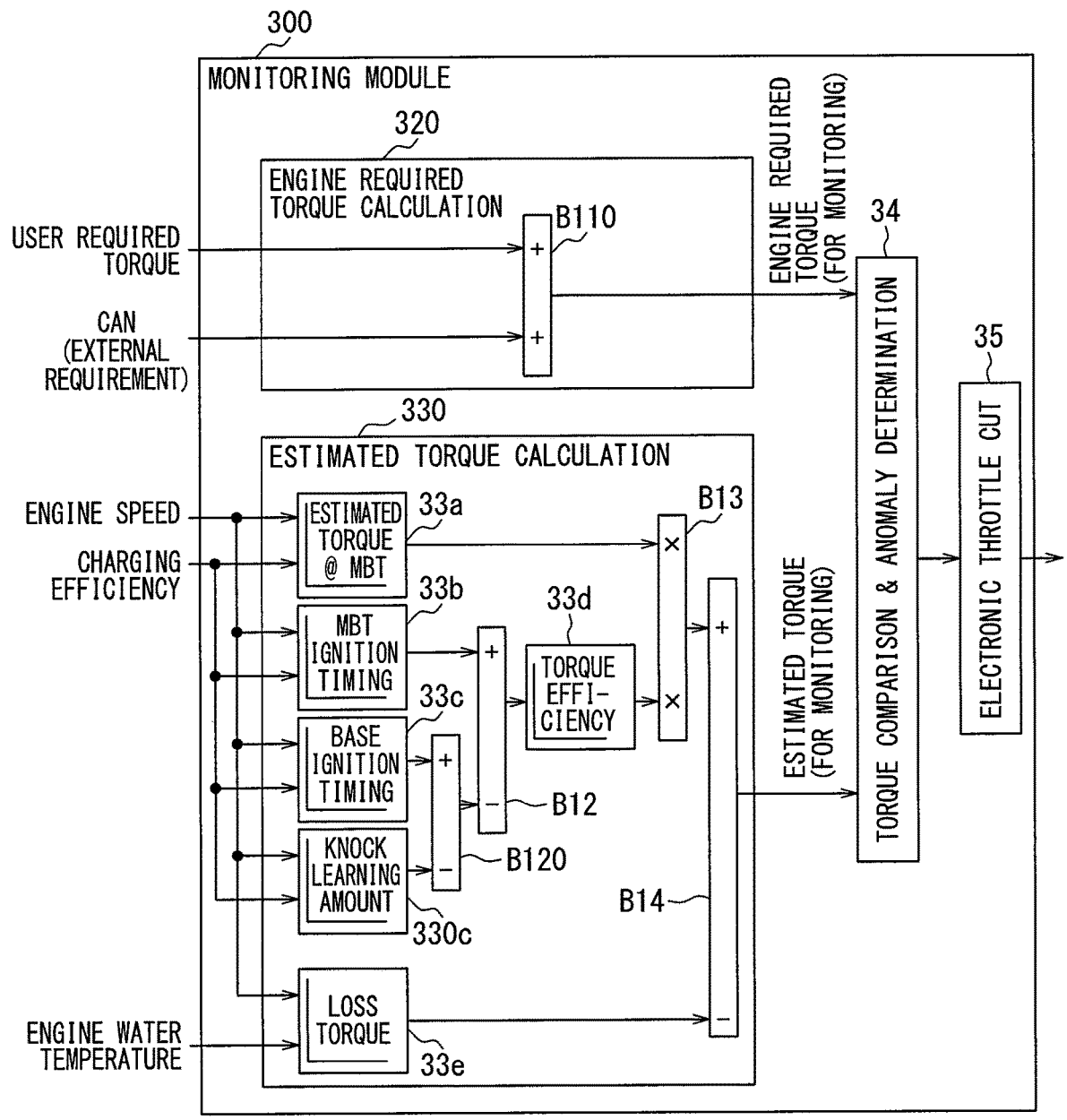
FIG. 10 is a block diagram of an internal combustion engine control system according to a second embodiment.

In the monitoring module 30 in the above-mentioned first embodiment, a reserve torque is reflected in an engine required torque calculated by the engine required torque computation unit 32 and a correction amount of ignition timing by knock learning is not reflected in an estimated torque calculated by the estimated torque computation unit 33. In a monitoring module 300 in the present embodiment, meanwhile, a reserve torque is not reflected in an engine required torque calculated by an engine required torque computation unit 320 as shown in FIG. 10. In addition, a correction amount of ignition timing by knock learning, that is, the above-mentioned knock learning amount is reflected in an estimated torque calculated by an estimated torque computation unit 330.

A more detailed description will be given. A computation unit B110 provided in the engine required torque computation unit 320 adds an external required torque to a user required torque to compute an engine required torque. The estimated torque computation unit 330 includes a knock learning amount calculation unit 330c and a computation unit B120 in addition to the various computation units provided in the estimated torque computation unit 33 shown in FIG. 3.

The knock learning amount calculation unit 330c calculates the above-mentioned knock learning amount based on a charging efficiency and an engine speed. For example, a map indicating a correlation between engine speed and charging efficiency and knock learning amount is stored in the memory 11m in advance and the knock learning amount calculation unit 330c refers to the map to calculate a knock learning amount corresponding to an engine speed and a charging efficiency. An intake air quantity may be used in place of a charging efficiency to calculate a knock learning amount and in short, a knock learning amount can be calculated with accuracy with use of a physical quantity in correlation with intake air quantity and an engine speed.

The computation unit B120 calculates a timing obtained by subtracting a knock learning amount calculated by the knock learning amount calculation unit 330c from a base ignition timing calculated by the base ignition timing calculation unit 33c, that is, a timing equivalent to a target ignition timing calculated at the control module 20. The computation unit B12 computes a value obtained by subtracting a target ignition timing calculated by the knock learning amount calculation unit 330c from an MBT ignition timing calculated by the MBT ignition timing calculation unit 33b as a knock inclusive base retard amount. A knock inclusive base retard amount is equivalent to a value obtained by adding a knock learning amount to a base retard amount. The torque efficiency calculation unit 33d calculates the above-mentioned torque efficiency based on a knock inclusive base retard amount calculated by the computation unit B12.

Figure 11:
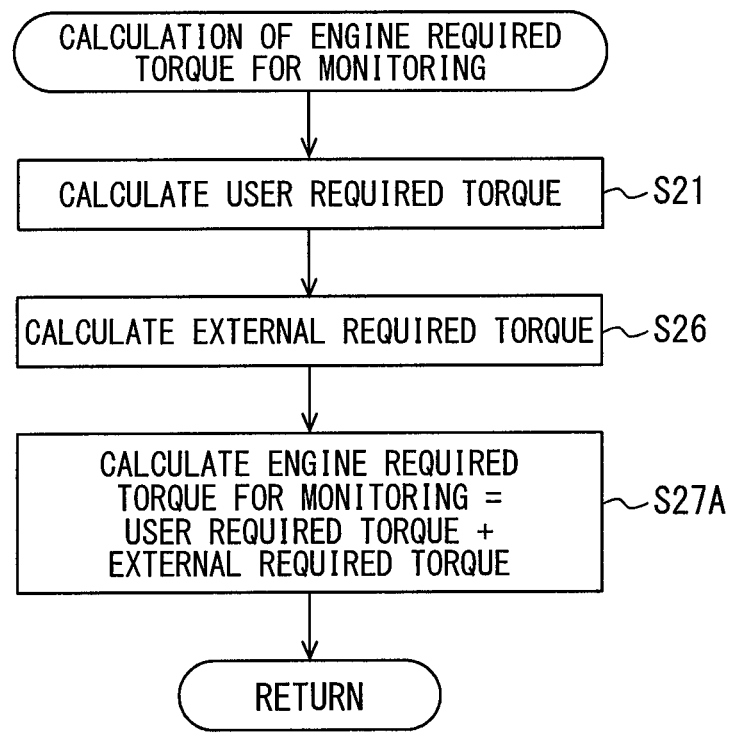
FIG. 11 is a flowchart illustrating a procedure for calculation processing for the required torque for monitoring shown in FIG. 10.
Figure 12:
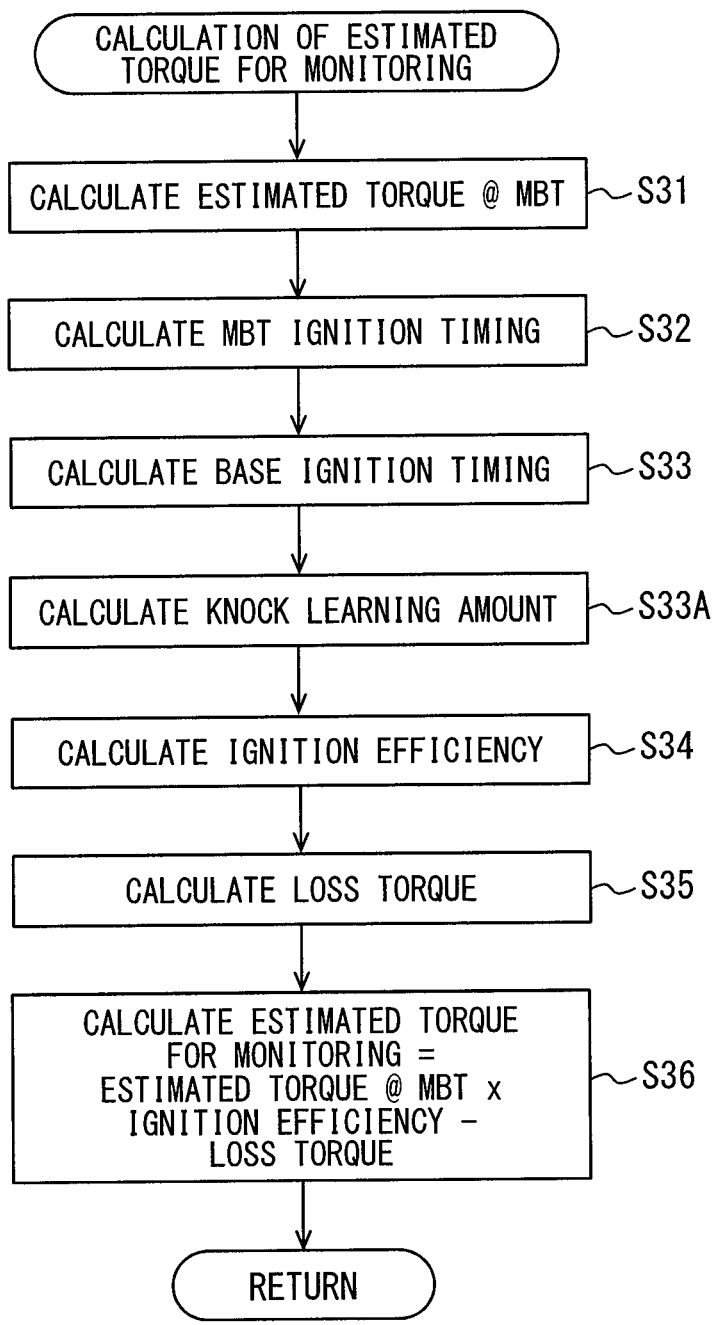
FIG. 12 is a flowchart illustrating a procedure for calculation processing for the estimated torque for monitoring shown in FIG. 10.

In the present embodiment, the subroutine processing shown in FIG. 7 and FIG. 8 is changed to subroutine processing shown in FIG. 11 and FIG. 12.

In the subroutine processing shown in FIG. 11, at S21, first, a user required torque is calculated and at S26, an external required torque that is a driving torque caused by an external requirement, such as increase in power generation amount, is calculated. At S27A, subsequently, the user required torque acquired at S21 and the external required torque acquired at S26 are added and a value obtained by this addition is calculated as an engine required torque for monitoring.

In the subroutine processing shown in FIG. 12, similarly to the subroutine processing shown in FIG. 8, at S31, first, an MBT estimated torque is calculated, at S32, an MBT ignition timing is calculated, and at S33, a base ignition timing is calculated. At S33A, the knock learning amount calculation unit 330c calculates a knock learning amount based on a charging efficiency and an engine speed.

At S34, a timing obtained by subtracting the knock learning amount calculated at S33A from the base ignition timing calculated at S33 is calculated. This timing is equivalent to an estimated value (estimated ignition timing) of an actual ignition timing. At S34, a knock inclusive base retard amount obtained by subtracting the estimated ignition timing from the MBT ignition timing calculated at S32 is calculated.

As in the subroutine processing shown in FIG. 8, at S35, a loss torque is calculated and at S36, the MBT estimated torque is multiplied by the ignition efficiency and the loss torque is subtracting from the value obtained by this multiplication to calculate an estimated torque for monitoring.

Figure 13:
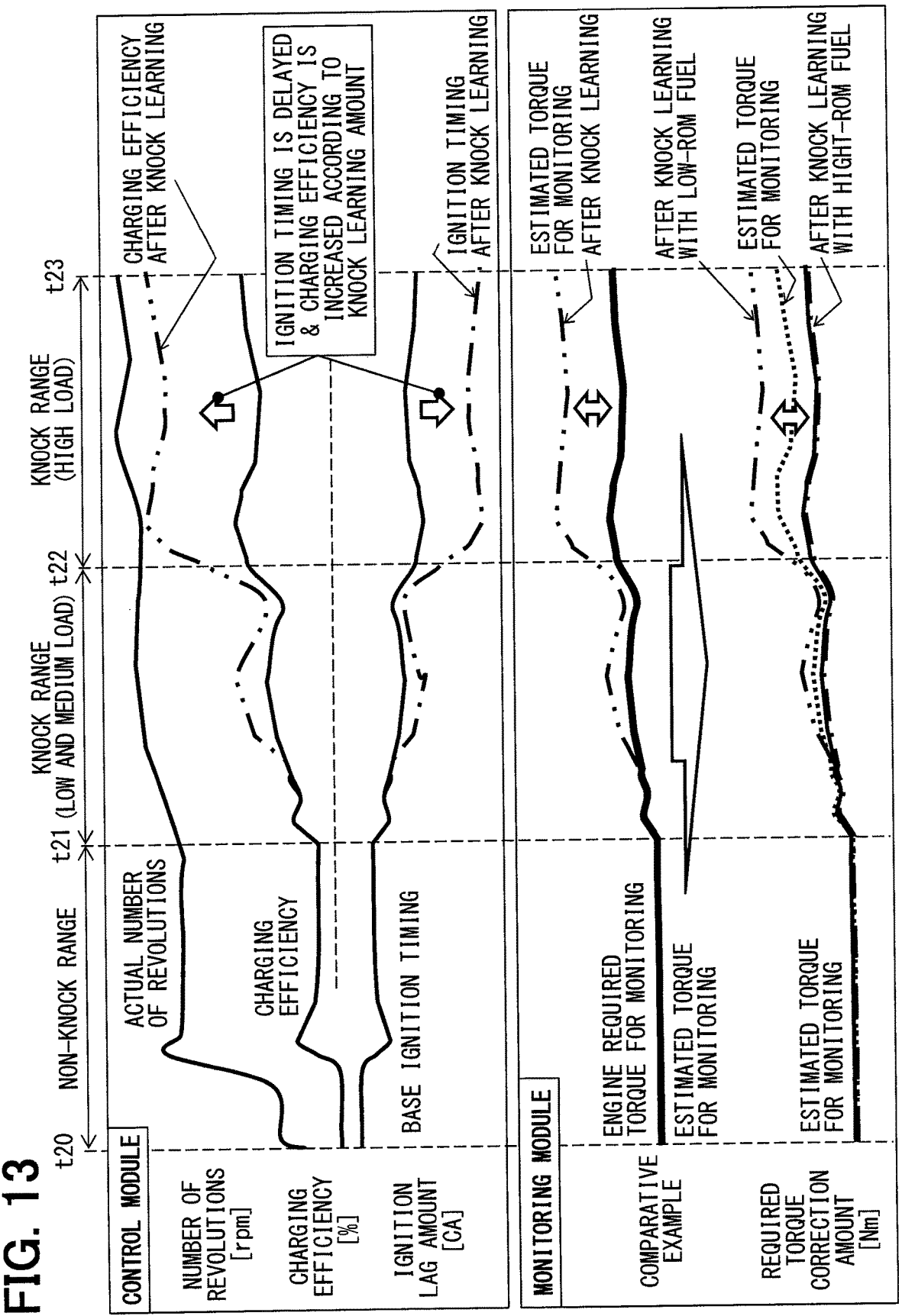
FIG. 13 is a time chart indicating a progression of results of computation by the control module and the monitoring module relative to a progression of an operating state of the internal combustion engine according to the second embodiment.

In the example shown in FIG. 13, at time of t20, a starter motor of an internal combustion engine is actuated to start operation of the internal combustion engine. Subsequently, till time of t21, a number of revolutions progresses in a range (non-knock range) in which a knock does not occur. Subsequently, till time of t22, the number of revolutions is increased and progresses in a range (low and medium load knock range) in which a knock occurs. Subsequently, till time of t23, the number of revolutions is increased and progresses in a range (high load knock range) in which a knock is more prone to occur. With respect to this progression of operating state of the internal combustion engine, the upper part of FIG. 13 indicates change in various values calculated by the control module and the lower part of FIG. 13 indicates change in various values calculated by the monitoring module.

First, a description will be given to the details of the upper part of FIG. 9 related to the control module 20. A knock learning amount is zero for the period (t20 to t21) of non-knock range, is increased in the subsequent low and medium load knock range, and is further increased in the subsequent high load knock range. With increase in knock learning amount, an ignition timing varies from a value indicated by a solid line to a value indicated by an alternate long and short dash line, that is, progresses toward the retard side. Caused by degradation in torque efficiency due to a retard in ignition timing, a charging efficiency varies from a value indicated by a solid line to a value indicated by an alternate long and two short dashes line.

A description will be given to the details of the lower part of FIG. 13 related to the monitoring module 300. In the part of comparative example, the solid lines indicate an estimated torque calculated at the estimated torque computation unit 330 and an engine required torque calculated at the engine required torque computation unit 320 when knock learning is not performed. When knock learning is not performed, these torques agree with each other. When the estimated torque computation unit 330 does not include the knock learning amount calculation unit 330c unlike the present embodiment, an estimated torque is increased by an amount equivalent to increase in air quantity as indicated by an alternate long and two short dashes line in the part of the comparative example. As a result, an erroneous monitoring result is obtained as described below:

Though a user required torque is not increased, a torque reserve is increased; therefore, though an engine required torque calculated without reflecting a torque reserve is not increased, an estimated torque with a knock learning amount not reflected is increased. For this reason, as shown in the arrow in the part of the comparative example, a deviation is produced between an engine required torque calculated at the engine required torque computation unit 320 and an estimated torque calculated at the estimated torque computation unit 330. As a result, even when an estimated torque is accurately calculated as a value close to an actual torque in a situation in which a torque greater than a user required torque by an amount equivalent to an actually required reserve torque is required, presence of a torque anomaly is erroneously determined because of a large deviation.

In the present embodiment, meanwhile, a knock learning amount is reflected in an estimated torque, an estimated torque can be brought close to a required torque as indicated by the dotted line in the part of required torque correction amount. A reason why the estimated torque and the required torque do not perfectly agree with each other will be described below:

In cases where a fuel low in research octane number (RON) that indicates ignitability of a spark ignition internal combustion engine is used, a knock learning amount is increased and a torque efficiency is degraded; therefore, a reserve torque is increased and an actual torque is increased as indicated by an alternate long and two short dashes line. Meanwhile, when a fuel high in octane number is used, a knock learning amount is reduced and a torque efficiency is enhanced; therefore, a reserve torque is reduced and an actual torque is reduced as indicated by an alternate long and short dash line. However, the estimated torque computation unit 330 does not estimate a torque efficiency by detecting an actual ignition timing. The knock learning amount calculation unit 330c estimates a knock learning amount from an engine speed and a charging efficiency and the estimated torque computation unit 330 estimates a torque efficiency from this estimated value. For this reason, estimation according to a used fuel is difficult.

Consequently, the knock learning amount calculation unit 330c estimates a knock learning amount by considering a fuel between a fuel highest in octane number and a fuel lowest in octane number among fuels assumed to be used as a used fuel. In the part of required torque correction amount in FIG. 13, the alternate long and two short dashes line indicates an estimated torque after knock learning obtained when a fuel lowest in octane number is used and the alternate long and short dash line indicates an estimated torque after knock learning obtained when a fuel highest in octane number is used. An estimated torque calculated by the estimated torque computation unit 330 in the present embodiment takes a value indicated by a dotted line, which value is between the lowest octane number and the highest octane number. As mentioned above, an estimated torque according to the present embodiment can be brought close to a required torque; therefore, a deviation between an engine required torque for monitoring and an estimated torque can be suppressed and a possibility of the above-mentioned erroneous determination can be suppressed.

According to the present embodiment, as mentioned above, the monitoring module 300 includes the engine required torque computation unit 320 computing an engine required torque and the estimated torque computation unit 330 computing an estimated torque.

The estimated torque computation unit 330 can be said to calculate an actual ignition timing based on operating state of an internal combustion engine, including an engine speed, a quantity of intake air to the internal combustion engine, and the like and to estimate a torque efficiency based on the calculated actual ignition timing. The estimated torque computation unit 330 computes an estimated torque based on an estimated torque efficiency. In further detail, the estimated torque computation unit 330 can be said to compute an estimated torque according to degradation in torque efficiency corresponding to a knock learning amount based on an engine speed and an intake air quantity. For this reason, a possibility of such erroneous determination as shown in the part of the comparative example shown in FIG. 13 can be suppressed and various torque anomaly can be monitored with accuracy.

In the present embodiment, a knock learning amount is calculated and an estimated torque for monitoring is computed based on the calculated knock learning amount; therefore, an estimated torque can be computed without use of a detection value of actual ignition timing. Since this type of detection values is short in detection cycle, a processing load on the input guarantee portion 31 is increased when an attempt is made to cause the input guarantee portion 31 to guarantee data. In addition, a number of ports for data input required of the input guarantee portion 31 is increased by an amount equivalent to the above-mentioned detection values and increase in cost of the input guarantee portion 31 is incurred. According to the present embodiment that allows an estimated torque to be computed without use of a detection value of actual ignition timing, suppression of a processing load on the monitoring module 300 and suppression of increase in cost can be achieved.

The present inventors have confirmed the following phenomena by tests and the like: In a normal state without occurrence of various torque anomaly, an engine required torque with a reserve torque reflected is closely correlated with an estimated torque with a knock learning not reflected and a deviation between these torques is reduced. In a normal state without occurrence of various torque anomaly, an engine required torque with a reserve torque not reflected is closely correlated with an estimated torque with a knock learning reflected and a deviation between these torques is reduced. In short, a reduction in torque corresponding to degradation in torque efficiency caused by an ignition retard due to knock learning can be said to be equivalent to a reserve torque.

Third Embodiment

An internal combustion engine control system according to the present embodiment is a modification to the first embodiment and any configuration element not especially covered here is identical with a corresponding configuration element in the first embodiment.

Figure 14:
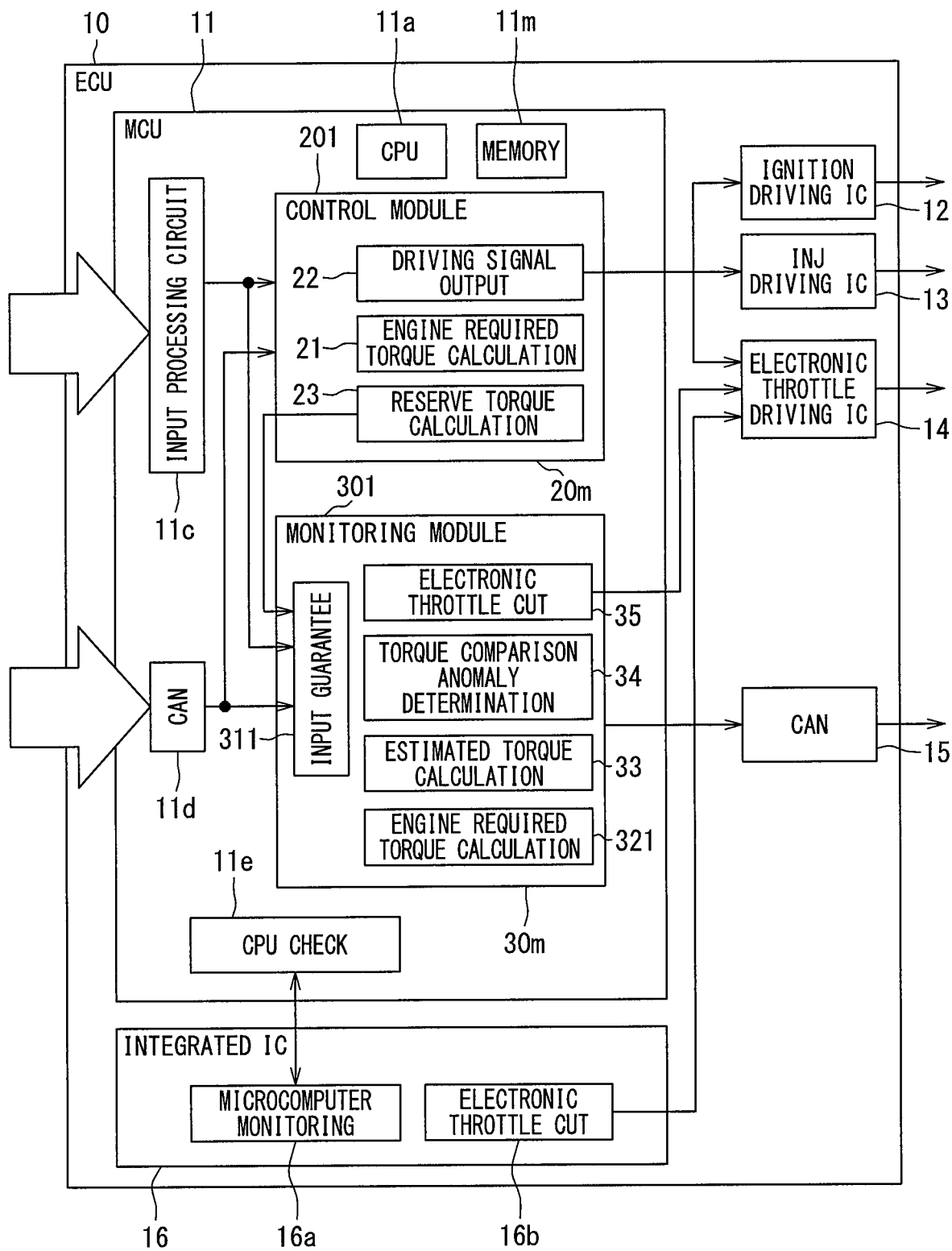
FIG. 14 is a block diagram of an internal combustion engine control system according to a third embodiment.

In each embodiment mentioned above, data used in computation at the monitoring modules 30, 300 is data (external data) transmitted from the input processing circuit 11c and the communication circuit 11d. In the present embodiment, meanwhile, as shown in FIG. 14, in addition to the above-mentioned external data, data (internal data) as a result of computation by a control module 201 is used in computation by a monitoring module 301. The control module 201 is configured by adding a reserve torque calculation unit 23 to the control module 20 shown in FIG. 2.

The reserve torque calculation unit 23 calculates a reserve torque obtained by converting a part of combustion energy of an internal combustion engine that is not converted into a driving torque and is equivalent to degradation in combustion efficiency into a torque. The reserve torque includes at least one of the idle reserve, catalyst warming-up reserve, and accessory reserve shown in FIG. 2. The computation unit B3 in the present embodiment adds respective reserve torques calculated at the reserve torque calculation unit 23 and outputs a result of this addition to the computation unit B4.

The driving signal output portion 22 functions also as an ignition timing control unit that sets a target ignition timing. As an ignition timing control unit, the driving signal output portion 22 adds a reserve torque calculated by the reserve torque calculation unit 23 to a user required torque and sets a target ignition timing based on the added torque.

An input guarantee portion 311 provided in the monitoring module 301 acquires internal data as well as external data and makes a check (for example, parity check) also on internal data for normality. Internal data acquired by the input guarantee portion 311 includes data on a reserve torque and in possession of this internal data acquired, the monitoring module 301 is equivalent to a reserve torque acquisition unit. When a value of reserve torque outputted from the control module 201 is out of a predetermined range, as a reserve torque acquisition unit, the input guarantee portion 311 acquires a value obtained by limiting the torque to an upper-limit torque or a lower-limit torque as a reserve torque value.

An engine required torque computation unit 321 computes an engine required torque based on a reserve torque (internal data) acquired by the input guarantee portion 311 and a user required torque (external data). A more detailed description will be given. The catalyst warming-up required torque calculation unit 32a and idle required torque calculation unit 32b in the first embodiment calculate a catalyst warming-up required torque and an idle required torque based on external data on a target number of revolutions and the like. In the present embodiment, meanwhile, the catalyst warming-up required torque calculation unit 32a and the idle required torque calculation unit 32b are removed and a value of reserve torque acquired by the input guarantee portion 311 is inputted directly to the computation unit B11.

According to the present embodiment, as mentioned above, the engine required torque computation unit 321 computes an engine required torque using a reserve torque value computed at the control module 201. For this reason, accuracy of computation of an engine required torque can be enhanced as compared with cases where a reserve torque value calculated from external data is used.

When a reserve torque value is out of a predetermined range, the torque is limited to an upper-limit torque or a lower-limit torque. For this reason, if the control module 201 is out of order and the control module 201 computes an improper reserve torque value, monitoring of various torque anomaly with an improper reserve torque value is suppressed. Consequently, degradation in monitoring accuracy caused by a failure in the control module 201 can be suppressed.

Fourth Embodiment

An internal combustion engine control system according to the present embodiment is a modification to the second embodiment and any configuration element not especially covered here is identical with a corresponding configuration element in the second embodiment.

Figure 15:
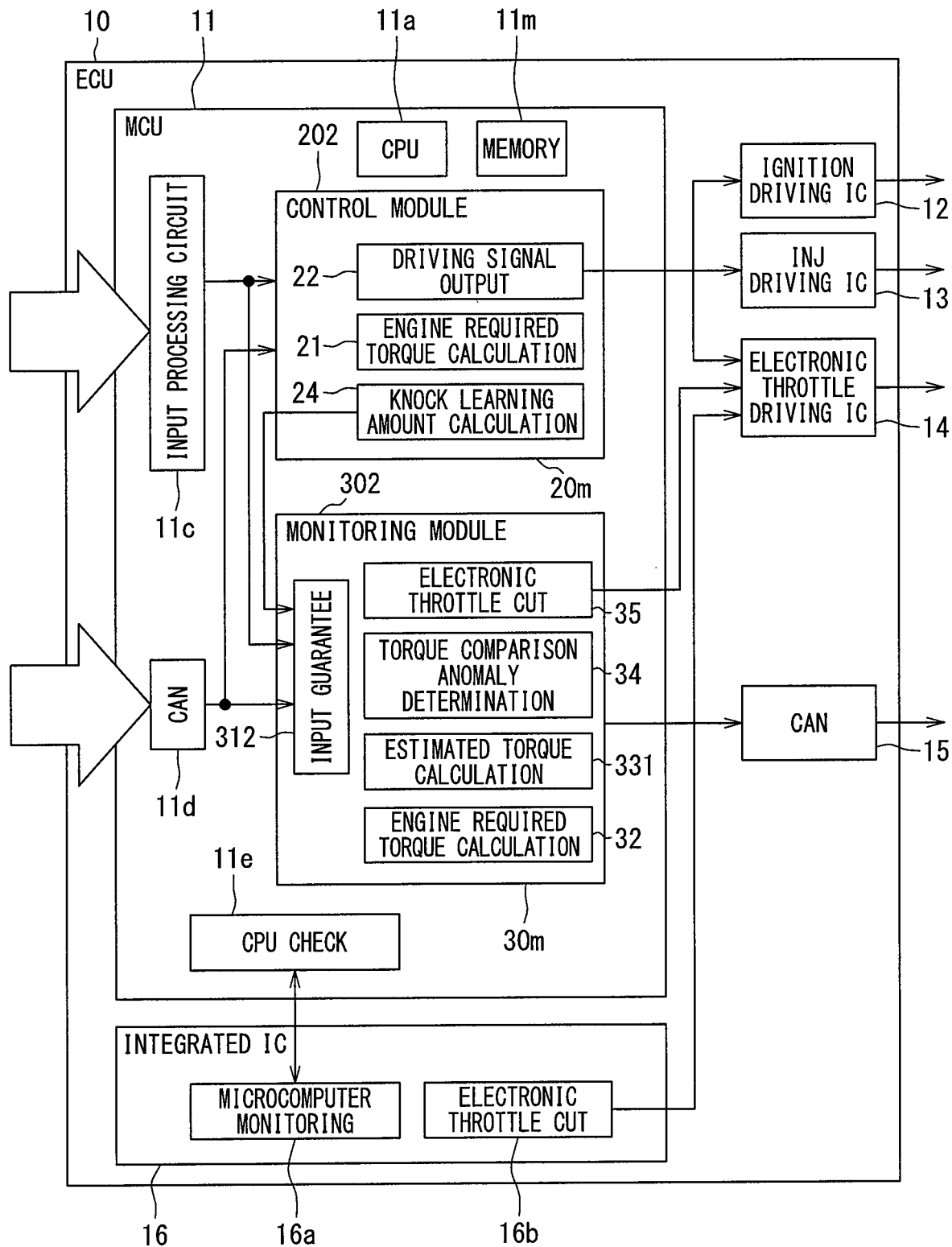
FIG. 15 is a block diagram of an internal combustion engine control system according to a fourth embodiment.

Also, in the present embodiment shown in FIG. 15, as in the third embodiment, in addition to the above-mentioned external data, data (internal data) as a result of computation by the control module 202 is used in computation by a monitoring module 302.

The control module 202 is configured by adding a knock learning amount calculation unit 24 to the control module 20 shown in FIG. 2 and the details of computation by the computation unit B5 are modified as described below. The knock learning amount calculation unit 24 calculates a knock learning amount by which an ignition timing is corrected according to the presence or absence of a knock in an internal combustion engine. Specifically, a correction amount is calculated such that an ignition timing is retarded each time a knock occurs and is advanced when a knock does not occur. The computation unit B5 in the present embodiment calculates a timing (target ignition timing) obtained by retarding a base ignition timing by a knock learning amount calculated by the knock learning amount calculation unit 24. Further, the computation unit B5 computes a timing obtained by subtracting a target ignition timing from an MBT ignition timing as an MBT retard amount that is an amount of a retard in target ignition timing relative to the MBT ignition timing. As an ignition timing control unit, the driving signal output portion 22 sets a timing obtained by retarding a base ignition timing by a knock learning amount calculated by the knock learning amount calculation unit 24 as a target ignition timing.

An input guarantee portion 312 provided in the monitoring module 302 acquires internal data as well as external data and makes a check (for example, parity check) also on internal data for normality. Internal data acquired by the input guarantee portion 312 includes a knock learning amount and in possession of this internal data acquired, the monitoring module 302 is equivalent to a retard amount acquisition unit. When a value of knock learning amount outputted from the control module 202 is out of a predetermined range, as a retard amount acquisition unit, the input guarantee portion 312 acquires a value obtained by limiting the torque to an upper-limit retard amount or a lower-limit retard amount as a knock learning amount.

An estimated torque computation unit 331 computes an estimated torque based on a knock learning amount (internal data) acquired by the input guarantee portion 312 and operating state (external data) of an internal combustion engine. A more detailed description will be given. In the second embodiment, the knock learning amount calculation unit 330c calculates a knock learning amount based on external data on a target number of revolutions and the like and the torque efficiency calculation unit 33d calculates a torque efficiency using the calculated knock learning amount. In the present embodiment, meanwhile, the knock learning amount calculation unit 330c is removed and a knock learning amount acquired by the input guarantee portion 312 is inputted directly to the computation unit B120.

According to the present embodiment, as mentioned above, the estimated torque computation unit 331 computes an estimated torque using a knock learning amount computed at the control module 202; therefore, accuracy of computation of an estimated torque can be enhanced as compared with cases where a knock learning amount calculated from external data is used.

When a knock learning amount is out of a predetermined range, the amount is limited to an upper-limit retard amount or a lower-limit retard amount. For this reason, if the control module 202 is out of order and the control module 202 calculates an improper knock learning amount, monitoring of various torque anomaly with an improper knock learning amount is suppressed. Consequently, degradation in monitoring accuracy caused by a failure in the control module 202 can be suppressed.

Other Embodiments

The disclosure of the present specification is not limited to the embodiments taken here as examples. The disclosure includes the embodiments taken here as examples and modifications by those skilled in the art based on those embodiments. For example, the disclosure is not limited to a combination of parts and/or elements described in relation to the above-mentioned embodiments. The disclosure can be implemented by various combinations. The disclosure may have an additional portion that can be added to the above-mentioned embodiments. The disclosure includes what is obtained by omitting a part and/or an element of the above-mentioned embodiment. The disclosure includes replacement or a combination of parts and/or elements between one embodiment and another embodiment. The disclosed technical scope is not limited to the technical scopes described in relation to the above-mentioned embodiments. It should be understood that some of disclosed technical scopes are indicated by a description of CLAIMS and include all the modifications within the meaning and scope equivalent to a description of CLAIMS.

In the first embodiment, an influence of actual ignition timing is reflected in computation of an engine required torque. Specifically, a reserve torque is calculated and a value obtained by this calculation is used to compute an engine required torque and a calculated value of reserve torque can be said to be reflected in computation of an engine required torque. Instead, a calculated value of reserve torque may be reflected in computation of an estimated torque.

In the second embodiment, an influence of actual ignition timing is reflected in computation of an estimated torque. Specifically, a knock learning amount is calculated and a value obtained by this calculation is used to compute an estimated torque and a calculated value of knock learning amount can be said to be reflected in computation of an estimated torque. Instead, a calculated value of knock learning amount may be reflected in computation of an engine required torque.

In each of the above-mentioned embodiments, an operation speed of the monitoring module 30 is lower than an operation speed of the control module 20. Specifically, check processing speed of the input guarantee portion 31 produces a bottleneck and as a result, operation speeds of the engine required torque computation unit 32 and the estimated torque computation unit 33 are lower than an operation speed of the engine required torque calculation unit 21. Unlike the foregoing, an operation speed of the monitoring module 30 may be equal to an operation speed of the control module 20.

In each of the above-mentioned embodiments, the control storage area 20m and the monitoring storage area 30m are established in the storage area in the single common memory 11m. Instead, the ECU 10 may be provided with a plurality of memories and a storage area in a first memory may be established as a control storage area with a storage area in a second memory being established as a monitoring storage area.

In each of the above-mentioned embodiments, the single common MCU 11 includes the control storage area 20m and the monitoring storage area 30m. Instead, the ECU 10 may be provided with a plurality of MCUs and configured such that a first MCU has a control storage area and a second MCU has a monitoring storage area.

In each of the above-mentioned embodiments, the ECU 10 is provided with a detection circuit that detects a driving current or voltage outputted from an ignition driving IC and the control modules 20, 201, 202 implement knock learning control using a detection value from the detection circuit. Instead, knock learning control may be implemented without use of the above-mentioned detection value by considering a command signal outputted from the driving signal output portion 22 to the ignition driving IC 12 as an actual ignition timing.

Figure 2:
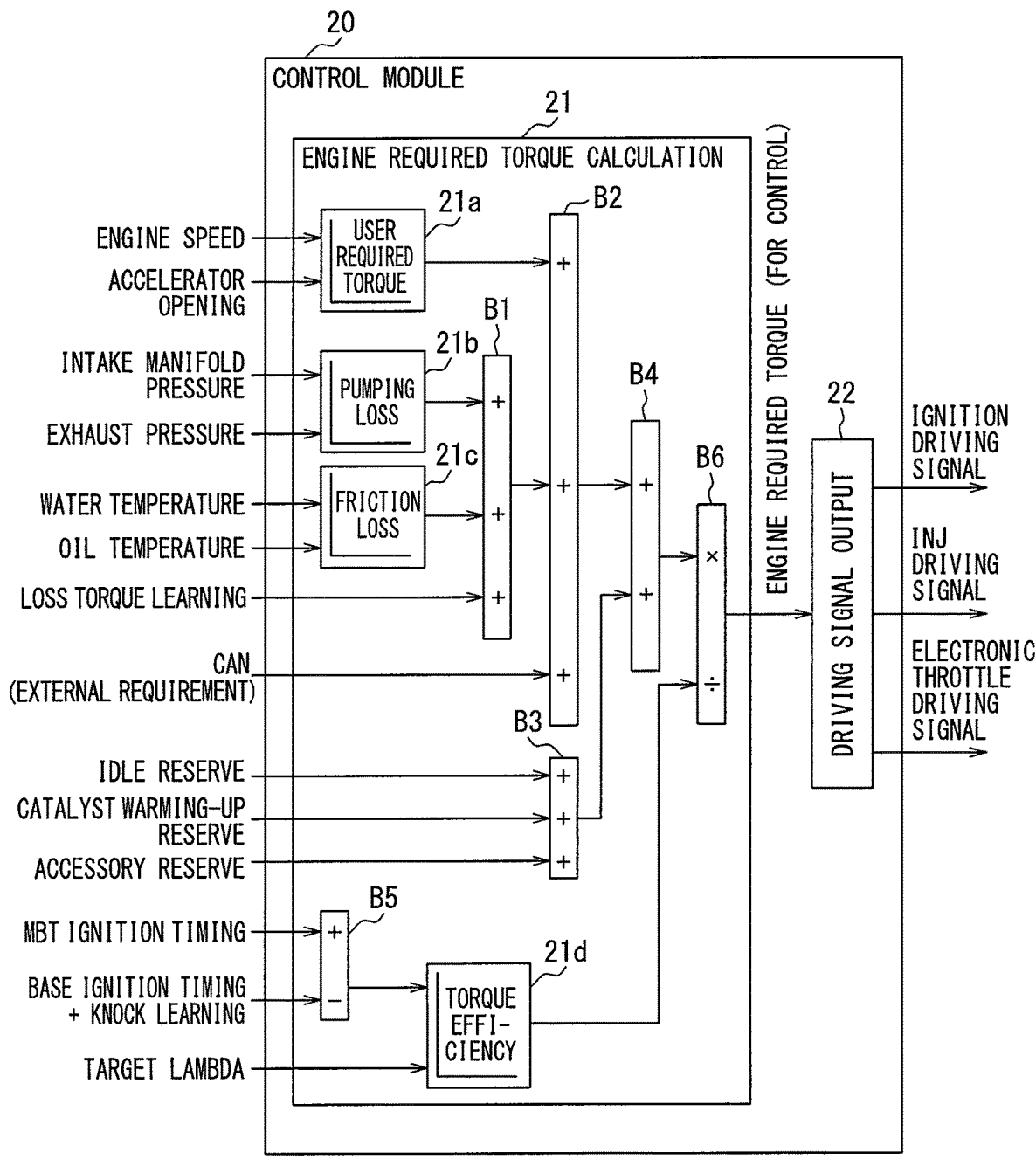
FIG. 2 is a block diagram of a control module shown in FIG. 1.

The computation unit B3 shown in FIG. 2 adds an idle reserve, a catalyst warming-up reserve, and an accessory reserve to compute a reserve torque and outputs the obtained reserve torque to the computation unit B4. Instead, the maximum values of idle reserve, catalyst warming-up reserve, and accessory reserve may be used as reserve torques to perform computation and a result of this computation may be outputted to the computation unit B4.

In the first embodiment, all of an idle reserve, a catalyst warming-up reserve, and an accessory reserve are used to calculate a reserve torque. Instead, at least one of these reserves may be used to calculate a reserve torque.

In the first embodiment, as shown in FIG. 3 and FIG. 7, both a catalyst warming-up required torque and an idle required torque are added to a user required torque to calculate an engine required torque. Instead, the larger required torque of a catalyst warming-up required torque and an idle required torque may be added to a user required torque to calculate an engine required torque.

The control module 20 shown in FIG. 2 may be provided with the reserve torque calculation unit 23 shown in FIG. 14 or the knock learning amount calculation unit 24 shown in FIG. 15.

In each of the above-mentioned embodiments, an in-vehicle internal combustion engine is controlled by the ECU 10. Instead, a stationary, rather than in-vehicle, internal combustion engine may be controlled by the ECU 10.

The invention claimed is:

1. An internal combustion engine control system comprising:
a control arithmetic unit configured to perform computation by using a control storage area and to compute a target control amount, which is a target value of a control amount of a state of combustion of an internal combustion engine, according to a user required torque that is a driving torque of the internal combustion engine required by a user; and
a monitoring arithmetic unit configured, by using a monitoring storage area different from the control storage area, to perform computation and to monitor presence or absence of a torque anomaly state in which an estimated torque is deviated from an engine required torque by a predetermined amount or more, the estimated torque being an estimated value of actual torque of the internal combustion engine, the engine required torque being required of the internal combustion engine, wherein the monitoring arithmetic unit includes an engine required torque computation unit configured to compute the engine required torque and an estimated torque computation unit configured to compute the estimated torque, and the engine required torque computation unit is configured to compute a reduction in an actual torque, which is caused by a retard in ignition timing of the internal combustion engine, as a reserve torque and to compute the engine required torque based on the reserve torque as calculated and the user required torque.

2. The internal combustion engine control system according to claim 1, wherein a catalyst for purifying exhaust gas is placed in an exhaust passage of the internal combustion engine, the control arithmetic unit is configured to set a target ignition timing as one of the target control amount to retard the target ignition timing when warming-up of the catalyst is required, and the engine required torque computation unit is configured to compute a reduction in an actual torque caused in conjunction with a retard due to the warming-up requirement and to compute the reserve torque based on the calculated reduction.

3. The internal combustion engine control system according to claim 1, wherein the control arithmetic unit is configured to set a target ignition timing as one of the target control amount to retard the target ignition timing during idling, and the engine required torque computation unit is configured to compute a reduction in an actual torque caused in conjunction with the retard during the idling and to compute the reserve torque based on the calculated reduction.

4. An internal combustion engine control system comprising:

a control arithmetic unit configured, by using a storage area, to perform computation to compute a target control amount that is a target value of a control amount, by which a state of combustion of the internal combustion engine is controlled, according to a user required torque that is a driving torque of the internal combustion engine required by a user; and a monitoring arithmetic unit configured to perform computation by using a monitoring storage area different from the control storage area, and to monitor presence or absence of a torque anomaly state in which estimated torque is deviated from an engine required torque by a predetermined amount or more, the estimated torque being an estimated value of actual torque of the internal combustion engine, the engine required torque being required of the internal combustion engine, wherein the control arithmetic unit includes:

a reserve torque calculation unit configured to calculate a reserve torque by converting a degradation in combustion efficiency into a torque, the degradation in combustion efficiency being equivalent to a part of combustion energy of the internal combustion engine that is not converted into a driving torque; and an ignition timing control unit configured to set a target ignition timing as the target control amount based on a torque obtained by adding the reserve torque calculated by the reserve torque calculation unit to the user required torque, wherein the monitoring arithmetic unit includes:

a reserve torque acquisition unit configured, when the reserve torque is out of a predetermined range, to acquire the reserve torque calculated by the reserve torque calculation unit and to limit the reserve torque to an upper-limit torque or a lower-limit torque; and an engine required torque computation unit configured to compute the engine required torque based on the user required torque and the reserve torque acquired by the reserve torque acquisition unit.

5. An internal combustion engine control system comprising:

a control arithmetic unit configured, by using a control storage area, to perform computation and to compute a target control amount, which is a target value of a control amount of a state of combustion of an internal combustion engine, according to a user required torque that is a driving torque of the internal combustion engine required by a user; and a monitoring arithmetic unit configured to perform computation by using a monitoring storage area different from the control storage area and to monitor presence or absence of a torque anomaly state in which an estimated torque is deviated from an engine required torque by a predetermined amount or more, the estimated torque being an estimated value of actual torque of the internal combustion engine, the engine required torque being required of the internal combustion engine, wherein the control arithmetic unit includes:

a knock learning amount calculation unit configured to calculate a knock learning amount, by which an ignition timing is corrected according to presence or absence of a knock in the internal combustion engine; and an ignition timing control unit configured to set a target ignition timing as the target control amount based on the knock learning amount calculated by the knock learning amount calculation unit, and the monitoring arithmetic unit includes:

a retard amount acquisition unit configured, when the knock learning amount is out of a predetermined range, to acquire the knock learning amount calculated by the knock learning amount calculation unit and to limit the retard amount to an upper-limit retard amount or a lower-limit retard amount; and an estimated torque computation unit configured to compute the estimated torque based on an operating state of the internal combustion engine and the knock learning amount acquired by the retard amount acquisition unit.

* * * * *